United States Patent
Wakabayashi et al.

(10) Patent No.: US 8,124,690 B2
(45) Date of Patent: Feb. 28, 2012

(54) MOISTURE CURABLE POLYMER HAVING SIF GROUP, AND CURABLE COMPOSITION CONTAINING THE SAME

(75) Inventors: Katsuyu Wakabayashi, Settsu (JP); Taisuke Sasaki, Takasago (JP)

(73) Assignee: Kaneka Corporation, Osaka (JP)

( * ) Notice: Subject to any disclaimer, the term of this patent is extended or adjusted under 35 U.S.C. 154(b) by 298 days.

(21) Appl. No.: 12/441,270

(22) PCT Filed: Aug. 23, 2007

(86) PCT No.: PCT/JP2007/066353
§ 371 (c)(1),
(2), (4) Date: Apr. 27, 2009

(87) PCT Pub. No.: WO2008/032539
PCT Pub. Date: Mar. 20, 2008

(65) Prior Publication Data
US 2009/0275702 A1     Nov. 5, 2009

(30) Foreign Application Priority Data

| | | |
|---|---|---|
| Sep. 13, 2006 | (JP) | 2006-248235 |
| Dec. 20, 2006 | (JP) | 2006-342745 |
| Jul. 26, 2007 | (JP) | 2007-194513 |
| Aug. 17, 2007 | (JP) | 2007-212825 |

(51) Int. Cl.
*C08L 83/12* (2006.01)
(52) U.S. Cl. ........... 525/102; 525/100; 525/474; 528/42
(58) Field of Classification Search ................... 525/102, 525/100, 474; 528/42
See application file for complete search history.

(56) References Cited

U.S. PATENT DOCUMENTS

| | | | |
|---|---|---|---|
| 4,507,469 A | | 3/1985 | Mita et al. |
| 4,904,732 A | | 2/1990 | Iwahara et al. |
| 6,117,543 A | * | 9/2000 | Zaima et al. .................. 428/332 |
| 7,115,695 B2 | | 10/2006 | Okamoto et al. |
| 2006/0264593 A1 | * | 11/2006 | Nagoh et al. .................. 526/319 |

FOREIGN PATENT DOCUMENTS

| | | | |
|---|---|---|---|
| CA | 2081242 A | | 4/1993 |
| JP | 52-073998 A | | 6/1977 |
| JP | 55-009669 A | | 1/1980 |
| JP | 55-043119 A | | 3/1980 |
| JP | 63-006041 A | | 1/1988 |
| JP | 05-117519 A | | 5/1993 |
| JP | 05-163344 A | | 6/1993 |
| JP | 06-024805 A | | 2/1994 |
| JP | 09-176320 A | | 7/1997 |
| JP | 09-324052 A | | 12/1997 |
| JP | 10-092803 | * | 4/1998 |
| JP | 10-092803 | | 4/1998 |
| JP | 2003-206410 A | | 7/2003 |
| JP | 2004-196971 A | | 7/2004 |

* cited by examiner

*Primary Examiner* — Ling Choi
*Assistant Examiner* — Chun-Cheng Wang
(74) *Attorney, Agent, or Firm* — Sughrue Mion, PLLC

(57) ABSTRACT

A moisture curable polymer and a curable composition having superior curability are provided. A polymer having a silicon group represented by the general formula: —$SiF_aR^1_bZ_c$ (wherein, $R^1$ represents any one of a substituted or unsubstituted hydrocarbon group having 1 to 20 carbon atoms, or an organosiloxy group represented by $R^2_3SiO$— ($R^2$ is each independently, a substituted or unsubstituted hydrocarbon group having 1 to 20 carbon atoms). Z is a hydroxyl group or a hydrolyzable group other than fluorine. a is any one of 1, 2, or 3; b is any one of 0, 1, or 2; c is any one of 0, 1, or 2; and a+b+c is 3. When b or c is 2, two $R^1$ or two Z may be each the same or different) and a curable composition including this polymer, and a sealant and an adhesive in which the curable composition is used.

11 Claims, No Drawings

MOISTURE CURABLE POLYMER HAVING SIF GROUP, AND CURABLE COMPOSITION CONTAINING THE SAME

TECHNICAL FIELD

The present invention relates to a polymer including a silicon group having a Si—F bond, and a curable composition containing the polymer.

BACKGROUND ART

Polymers including at least one reactive silicon group in the molecule have been known to be characterized by availability of rubbery cured products by crosslinking via formation of a siloxane bond, which is accompanied by a hydrolysis reaction or the like of the reactive silicon group due to the moisture and the like even at room temperatures.

Among these polymers having a reactive silicon group, organic polymers such as polyoxyalkylene based polymers and polyisobutylene based polymers including a typical main chain skeleton are disclosed in Patent Document 1, Patent Document 2 etc., and have been already produced industrially and used broadly in applications such as sealants, adhesives, and paints. Furthermore, a large number of reports including Patent Document 3 have been made also regarding curable compositions constituted with a polymer having a main chain skeleton of polysiloxane, particularly diorganopolysiloxane.

When such polymers are used in curable compositions for use in sealants, adhesives, paints and the like, a variety of characteristics such as curability and adhesiveness, as well as mechanical characteristics of the cured products, and the like are required.

The curable composition including the polymer having a reactive silicon group is cured using a curing catalyst such as an organic tin compound which is commonly typified by dibutyltin bis(acetylacetonato) and which has a carbon-tin bond. In use, when curing within a short period of time is required, generally employed method includes increasing the amount of the curing catalyst, and the like. However, in recent years, toxicity of the organic tin compounds has been indicated, and thus these compounds must be carefully used in light of environmental security. As the curing catalyst other than the organic tin compounds, tin carboxylates and other metal carboxylates are disclosed in Patent Document 4 and Patent Document 5, and catalyst systems in which carboxylic acid and an amine compound are used in combination are disclosed in Patent Document 6. However, many of these catalysts are inferior in curability as compared with organic tin catalysts.

Patent Document 1: JP-A-52-73998
Patent Document 2: JP-A-63-6041
Patent Document 3: JP-A-55-43119
Patent Document 4: JP-A-55-9669
Patent Document 5: JP-A-2003-206410
Patent Document 6: JP-A-5-117519

DISCLOSURE OF THE INVENTION

Problems to be Solved by the Invention

An object of the present invention is to provide a moisture curable polymer that is a polymer which is curable with moisture at a room temperature and that exhibits rapid curability without substantially using an organic tin catalyst, and a moisture curable composition including the same.

Means for Solving the Problems

The present inventors elaborately investigated in view of the foregoing circumstances, and consequently found that a novel polymer having a specific terminal structure can solve the problems described above. Accordingly, the present invention was accomplished.

More specifically, aspects provided by the present invention are as in the following.

(I) A polymer (hereinafter, may be merely referred to as "polymer (A)") including a silicon group having a Si—F bond.

(II) The polymer according to the above paragraph (I) wherein the silicon group having a Si—F bond is represented by the following general formula (1):

$$-\text{SiF}_a\text{R}^1_b\text{Z}_c \quad (1)$$

(wherein, $R^1$ represents any one of a substituted or unsubstituted hydrocarbon group having 1 to 20 carbon atoms, or an organosiloxy group represented by $R^2_3\text{SiO}-$ ($R^2$ is each independently, a substituted or unsubstituted hydrocarbon group having 1 to 20 carbon atoms). Z is a hydroxyl group or a hydrolyzable group other than fluorine. a is any one of 1, 2, or 3; b is any one of 0, 1, or 2; c is any one of 0, 1, or 2; and a+b+c is 3. When b or c is 2, two $R^1$ or two Z may be each the same or different).

(III) The polymer according to the above paragraph (II) wherein the silicon group having a Si—F bond represented by the above general formula (1) is included in the number of one or more on average per molecule.

(IV) The polymer according to the above paragraph (II) or (III) having a number average molecular weight of 3,000 to 100,000.

(V) The polymer according to any one of the above paragraphs (II) to (IV) wherein Z in the above general formula (1) is an alkoxy group.

(VI) The polymer according to any one of the above paragraphs (I) to (V) wherein the main chain skeleton is at least one selected from the group consisting of a polyoxyalkylene based polymer, a saturated hydrocarbon based polymer, and a (meth)acrylic ester based polymer.

(VII) A curable composition including the polymer according to any one of the above paragraphs (I) to (VI).

(VIII) The curable composition according to the above paragraph (VII) further including a polymer (hereinafter, may be merely referred to as "polymer (B)") having one or more silicon groups on average per molecule which are represented by the following general formula (2):

$$-\text{SiR}^3_{3-d}\text{Y}_d \quad (2)$$

(wherein, $R^3$ each independently represents a hydrocarbon group having 1 to 20 carbon atoms, or an organosiloxy group represented by $R^4_3\text{SiO}-$ ($R^4$ is each independently, a hydrocarbon group having 1 to 20 carbon atoms). Further, Y is each independently, a hydroxyl group or a hydrolyzable group other than fluorine. d is any one of 1, 2, or 3).

(IX) The curable composition according to the above paragraph (VIII) wherein the polymer (B) is an organic polymer having at least one main chain skeleton selected from the group consisting of a polyoxyalkylene based polymer, a saturated hydrocarbon based polymer, and a (meth)acrylic ester based polymer.

(X) The curable composition according to the above paragraph (VIII) or (IX) wherein Y in the above general formula (2) is an alkoxy group.

(XI) The curable composition according to any one of the above paragraphs (VII) to (X) further including a curing catalyst.
(XII) The curable composition according to the above paragraph (XI) wherein the curing catalyst is an amine compound.
(XIII) A sealant prepared using the curable composition according to any one of the above paragraphs (VII) to (XII).
(XIV) An adhesive prepared using the curable composition according to any one of the above paragraphs (VII) to (XII).

Effects of the Invention

The polymer and curable composition of the present invention has superior curability without need of using an organic tin catalyst. Such a curable composition of the present invention can be suitably used in sealants and adhesives.

BEST MODE FOR CARRYING OUT THE INVENTION

Hereinafter, the present invention will be explained in detail. A silicon-containing group having a hydrolyzable group or a hydroxyl group bound to a silicon atom, and capable of crosslinking by forming a siloxane bond herein may also referred to as "reactive silicon group".

The polymer including a silicon group having a Si—F bond (polymer (A)), and the curable composition including the polymer (A) of the present invention are directed to a moisture curable polymer and a moisture curable composition which exhibit the curability by moisture even at room temperatures.

Polymer (A)

The polymer (A) of the present invention is characterized by exhibiting rapid curability as compared with polymer (B) which does not have any Si—F bond, but has a reactive silicon group having a hydrolyzable group other than fluorine. Moreover, by using the polymer (A) and the polymer (B) in combination, a curable composition that exhibits rapid curability can also be obtained.

The Si—F bond in the polymer (A) achieves the effect at any site in the polymer molecule, and may be represented by —SiR'$_2$F when incorporated at the end of the main chain or side chain, or may be represented by —SiR'F— or =SiF when incorporated in the polymer main chain (wherein R' is each independently an arbitrary group).

Examples of the silicon group having a Si—F bond positioned at the end of the main chain or side chain include silicon groups represented by the following general formula (1):

(wherein, $R^1$ represents any one of a substituted or unsubstituted hydrocarbon group having 1 to 20 carbon atoms, or an organosiloxy group represented by $R^2_3SiO$— ($R^2$ is each independently, a substituted or unsubstituted hydrocarbon group having 1 to 20 carbon atoms). Z is a hydroxyl group or a hydrolyzable group other than fluorine. a is any one of 1, 2, or 3; b is any one of 0, 1, or 2; c is any one of 0, 1, or 2; and a+b+c is 3. When b or c is 2, two $R^1$ or two Z may be each the same or different).

Examples of the hydrolyzable group other than fluorine represented by Z in the above general formula (1) include a hydrogen atom, halogen atoms other than fluorine, alkoxy groups, acyloxy groups, ketoxymate groups, amino groups, amide groups, acid amide groups, aminooxy groups, mercapto groups, alkenyloxy groups, and the like. Among these, a hydrogen atom, alkoxy groups, acyloxy groups, ketoxymate groups, amino groups, amide groups, aminooxy groups, mercapto groups and alkenyloxy groups are preferred, and alkoxy groups are particularly preferred in light of mild hydrolyzability and favorable handlability.

Further, specific examples of $R^1$ in the above general formula (1) include e.g., alkyl groups such as a methyl group and an ethyl group, cycloalkyl groups such as a cyclohexyl group, aryl groups such as a phenyl group, aralkyl groups such as a benzyl group, triorganosiloxy groups represented by $R^2_3SiO$—, wherein $R^2$ is a methyl group, a phenyl group or the like, and the like. Among these, a methyl group is particularly preferred.

Specifically, illustrative examples of the silicon group represented by the general formula (1) include: a fluorodimethylsilyl group, a fluorodiethylsilyl group, a fluorodipropylsilyl group, a fluorodiphenylsilyl group, a fluorodibenzylsilyl group, a difluoromethylsilyl group, a difluoroethylsilyl group, a difluorophenylsilyl group, a difluorobenzylsilyl group, a trifluorosilyl group and the like as the silicon group not having a hydrolyzable group other than fluorine; a fluoromethoxymethylsilyl group, a fluoroethoxymethylsilyl group, a fluoromethoxyethylsilyl group, a fluoromethoxyphenylsilyl group, a fluorodimethoxysilyl group, a fluorodiethoxysilyl group, a fluorodipropoxysilyl group, a fluorodiphenoxysilyl group, a fluorobis(2-propenoxy)silyl group, a difluoromethoxysilyl group, a difluoroethoxysilyl group, a difluorophenoxysilyl group, a fluorodichlorosilyl group, a difluorochlorosilyl group and the like as the silicon group having both fluorine and other hydrolyzable group, and the like. In light of ease in synthesis, fluorodimethylsilyl group, a difluoromethylsilyl group, a trifluorosilyl group, a fluoromethoxymethylsilyl group, a fluoroethoxymethylsilyl group, a fluoromethoxyethylsilyl group, a fluorodimethoxysilyl group, a fluorodiethoxysilyl group, a difluoromethoxysilyl group, and a difluoroethoxysilyl group are more preferred; the silicon group not having a hydrolyzable group except for fluorine such as a fluorodimethylsilyl group, a difluoromethylsilyl group, a trifluorosilyl group and the like are more preferred; and a difluoromethylsilyl group is particularly preferred. In light of high curability, silicon groups having 2 or 3 fluorine atoms substituted on the silicon group such as a difluoromethylsilyl group, a difluoromethoxysilyl group, a difluoroethoxysilyl group, a trifluorosilyl group and the like are preferred, and a trifluorosilyl group is most preferred.

Among the silicon groups having a Si—F bond (hereinafter, may be referred to as fluorosilyl group), examples of those incorporated in a polymer main chain include —Si(CH$_3$)F—, —Si(C$_6$H$_5$)F—, —SiF$_2$—, =SiF, and the like.

Herein, the polymer (A) of the present invention may be either a single polymer having the same type of fluorosilyl group and main chain skeleton, i.e., a single polymer having the same number of fluorosilyl groups per molecule, the same bond position thereof and the same number of F included in the fluorosilyl group, and the same type of main chain skeleton, or a mixture of multiple polymers of in which any or all of these are different. In either case in which the polymer (A) of the present invention is a single polymer or a mixture of multiple polymers, the polymer (A) can be suitably used as a resin component of a curable composition that exhibits rapid curability, but in order to obtain a rubbery cured product which achieves high curability, and exhibits high strength, great elongation and low modulus of elasticity, the number of the fluorosilyl groups included in the polymer (A) may be at least one, preferably 1.1 to 5, and more preferably 1.2 to 3 on average per molecule of the polymer. When the number of the fluorosilyl groups on average included in one molecule is less than 1, the curability may be insufficient, and favorable rubber elastic behavior can be less likely to be exhibited. In contrast, when the number of the fluorosilyl groups included in one molecule is more than 5 on average, the elongation of the rubbery cured product may be reduced. As described above, the fluorosilyl group may be present either at the end of the main chain, or at the end of the side chain of the polymer molecular chain, or incorporated in the main chain. However, in particular, when it is present at the end of the main chain, effective mesh size of the network of the organic polymer component included in the cured product formed finally can be increased, therefore, a rubbery cured product that exhibits high strength and great elongation with low modulus of elasticity is more likely to be obtained. When two or more fluorosilyl groups are present in one molecule, each silicon group may be the same or different.

Moreover, the polymer (A) of the present invention may include a substituent group other than a silicon group having a Si—F bond, such as a silicon group having only a hydrolyzable group other than fluorine (for example, methyldimethoxysilyl group and the like) as a hydrolyzable group, together with a fluorosilyl group. As such a polymer (A), for example, polymers in which one end of the main chain is a silicon group having a Si—F bond, while other end of the main chain is a silicon group having only a hydrolyzable group other than fluorine as a hydrolyzable group may be exemplified.

The fluorosilyl group may be introduced using any method, and may involve: an introduction method by a reaction of a low molecular silicon compound having a fluorosilyl group with a polymer (method (i)); and a method in which the silicon group of a polymer including a reactive silicon group having a hydrolyzable group other than fluorine (hereinafter, may be referred to as "polymer X") is converted into a fluorosilyl group (method (ii)).

Specific examples of the method (i) include the followings.
(1) A method in which a polymer having a functional group such as a hydroxyl group, an epoxy group or an isocyanate group in the molecule is allowed to react with a compound having a fluorosilyl group and another functional group that is reactive to abovementioned functional group. For example, a method in which a polymer having a hydroxyl group at the end is allowed to react with isocyanatepropyldifluoromethylsilane, and a method in which a polymer having a SiOH group at the end is allowed to react with difluorodiethoxysilane may be included.
(2) A method in which hydrosilane having a fluorosilyl group is allowed to react with a polymer including an unsaturated group in the molecule to permit hydrosilylation. For example, a method in which a polymer having an allyl group at the end is allowed to react with difluoromethylhydrosilane may be included.
(3) A method in which a polymer having an unsaturated group is allowed to react with a compound having a mercapto group and a fluorosilyl group. For example, a method in which a polymer having an allyl group at the end is allowed to react with mercaptopropyldifluoromethylsilane may be included.

Additionally, in the method (ii), any known process may be employed for converting a reactive silicon group having a hydrolyzable group other than fluorine into a fluorosilyl group. Specifically, a process which an alkoxysilyl group, a chlorosilyl group, or a hydrosilyl group is each converted into a fluorosilyl group may be involved, and any of various types of fluorinating agents can be used in fluorination. Specific examples of the fluorinating agent include: $NH_4F$, $Bu_4NF$ (wherein Bu represents a butyl group), HF, $BF_3$, $Et_2NSF_3$ (wherein Et represents an ethyl group), $HSO_3F$, $SbF_5$, $VOF_3$, $CF_3CHFCF_2NEt_2$ and the like for fluorination of alkoxysilane; $AgBF_4$, $SbF_3$, $ZnF_2$, NaF, KF, CsF, $NH_4F$, $CuF_2$, $NaSiF_6$, $NaPF_6$, $NaSbF_6$, $NaBF_4$, $Me_3SnF$ (wherein Me represents a methyl group), $KF(HF)_{1.5-5}$ and the like for fluorination of chlorosilane; and AgF, $PF_5$, $Ph_3CBF_4$, $SbF_3$, $NOBF_4$, $NO_2BF_4$ and the like for fluorination of hydrosilane; but not limited thereto. With respect to the foregoing fluorination, summary may be found in Organometallics, 1996, 15, p. 2478 (Ishikawa et al.), and the like. In light of simplicity, efficiency, safety and the like of the reaction, fluorination of an alkoxysilyl group using $BF_3$, and fluorination of a chlorosilyl group using $CuF_2$ or $ZnF_2$ are preferred. As the source of $BF_3$, a $BF_3$ gas, a $BF_3$ ether complex, a $BF_3$ thioether complex, a $BF_3$ amine complex, a $BF_3$ piperidine complex, a $BF_3$ alcohol complex, a $BF_3$ phenol complex, a $BF_3$ carboxylic acid complex, $BF_3$ dihydrate, a $BF_3$ phosphoric acid complex and the like can be used, and in light of ease of handling, a $BF_3$ ether complex, a $BF_3$ thioether complex, a $BF_3$ amine complex, a $BF_3$ alcohol complex, a $BF_3$ carboxylic acid complex, and $BF_3$ dihydrate are preferred. Of these, a $BF_3$ ether complex, a $BF_3$ alcohol complex, and $BF_3$ dihydrate are more preferred due to high activity, efficient progress of fluorination, the absence of generation of salts and the like as by-products, and ease of post-treatment. Moreover, a $BF_3$ ether complex is particularly preferred. In addition, in fluorination by a $BF_3$ ether complex, heating is preferably carried out for permitting more efficient fluorination although the reaction may proceed without heating. In fluorination by a $BF_3$ complex, coloring may occur depending on the type of the polymer X used, and in light of suppression of the coloring, a $BF_3$ alcohol complex, or $BF_3$ dihydrate is preferably used.

It is possible that the fluorinating agent for use in producing the polymer (A) also serves as a curing catalyst of the polymer (A). Thus, when moisture is present in producing the polymer (A) using the aforementioned method (ii), a silanol condensation reaction may proceed, whereby the viscosity of the resulting polymer (A) may be increased. Therefore, it is desired that the production of the polymer (A) is carried out in an environment including moisture as little as possible, and the polymer X to be fluorinated is preferably subjected to a dehydration process such as azeotropic dehydration using toluene, hexane or the like prior to the fluorination. However, when a $BF_3$ amine complex is used, fluorination hardly proceeds after the dehydration operation, and the reactivity is likely to be improved by adding a slight amount of moisture, therefore, addition of moisture in the range to provide acceptable elevation of the viscosity is preferred. Furthermore, it is preferred that the fluorinating agent and the fluorinating agent-derived components generated as by-products be removed by filtration, decantation, liquid separation, devolatilization under reduced pressure, or the like following the fluorination. When the polymer (A) is produced using the aforementioned $BF_3$ based fluorinating agent, the amount of $BF_3$ remaining in the produced polymer (A), and the $BF_3$-derived components yielded by the reaction, in terms of the amount of B, is preferably less than 500 ppm, more preferably less than 100 ppm, and particularly preferably less than 50 ppm. By removing the $BF_3$ and $BF_3$-derived components, elevation of viscosity of the resulting polymer (A) itself, and the mixture of the polymer (A) and the polymer X, and the like can be suppressed. In this regard, the fluorination process in which a $BF_3$ ether complex, or a $BF_3$ alcohol complex is used is preferred since the boron components can be removed comparably easily by devolatilization in vacuo, and the process in which a $BF_3$ ether complex is used may be particularly preferred.

Herein, when the polymer X has two or more hydrolyzable groups other than fluorine, all hydrolyzable groups may be fluorinated, or they may be partially fluorinated by adjusting the fluorinating conditions through a procedure such as decrease in the amount of the fluorinating agent. For example, when the polymer (A) is produced using the polymer X in the aforementioned method (ii), the amount of the fluorinating agent used is not particularly limited, and it is acceptable that the molar quantity of the fluorine atom in the fluorinating agent is no less than the equimolar quantity with respect to the molar quantity of the polymer X. When fluorination of all hydrolyzable groups included in the polymer X by the method (ii) is intended, it is preferred that the fluorinating agent be used in an amount to give the molar quantity of the fluorine atom in the fluorinating agent is no less than the equimolar with respect to total molar quantity of the hydrolyzable group in the reactive silicon group included in the polymer X. The term "fluorine atom in the fluorinating agent" herein referred to means fluorine atoms which can substitute for the fluorine atom effective in fluorination in the fluorinating agent, specifically, the hydrolyzable group in the reactive silicon group of the polymer X.

The low molecular compound having a fluorosilyl group in the method (i) can be also synthesized from a reactive silicon group-containing low molecular compound, which may be generally employed, using the fluorination method described above.

In the method (i), because of the presence of a reactive group for allowing the polymer to react with the silicon-containing low molecular compound together with the fluorosilyl group, to obtain the polymer (A) by the method (ii) preferred when the reaction becomes complicated.

The method for production of a polymer including a reactive silicon group having a hydrolyzable group other than fluorine (polymer X) used in the aforementioned method (ii) will be described later.

Although the glass transition temperature of the polymer (A) is not particularly limited, it is preferably no higher than 20° C., more preferably no higher than 0° C., and particularly preferably no higher than −20° C. When the glass transition temperature is beyond 20° C., the viscosity may be increased during winter season or in cold region, thereby leading to difficulties in handling, and the flexibility of the cured product obtained when used as a curable composition may be reduced, which may be accompanied by decrease in elongation. The glass transition temperature can be determined by DSC measurement.

The polymer (A) may be either straight, or branched. The number average molecular weight of the polymer (A) is preferably approximately 3,000 to 100,000, more preferably 3,000 to 50,000, and particularly preferably 3,000 to 30,000 in terms of the polystyrene equivalent measured with GPC. When the number average molecular weight is less than 3,000, the cured product is likely to be disadvantageous with respect to the elongation characteristics, while the number average molecular weight of beyond 100,000 is likely to be disadvantageous with respect to the workability due to high viscosity.

Next, the main chain skeleton of the polymer (A) of the present invention is explained in detail. Moreover, the method for production of a polymer including a reactive silicon group having a hydrolyzable group other than fluorine (polymer X) for synthesizing the polymer (A) by the aforementioned method (ii) is also explained.

The main chain skeleton of the polymer (A) of the present invention is not particularly limited, and the polymer having various types of main chain skeletons can be used.

Specifically, illustrative examples include polyoxyalkylene based polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon based polymers such as ethylene-propylene based copolymers, polyisobutylene, copolymers of isobutylene with isoprene and the like, polychloroprene, polyisoprene, copolymers of isoprene or butadiene with acrylonitrile and/or styrene, polybutadiene, copolymers of isoprene or butadiene with acrylonitrile and styrene and the like, and hydrogenated polyolefin based polymers obtained by hydrogenation of these polyolefin based polymer; polyester based polymers obtained by condensation of dibasic acid such as adipic acid with glycol, or by ring opening polymerization of lactones; (meth)acrylic ester based polymers obtained by radical polymerization of a monomer such as ethyl(meth)acrylate, butyl (meth)acrylate or the like; vinyl based polymers obtained by radical polymerization of a monomer such as a (meth)acrylic ester based monomer, vinyl acetate, acrylonitrile, or styrene or the like; graft polymers obtained by polymerization of a vinyl monomer in the aforementioned polymer; polysulfide based polymers; polyamide based polymers such as polyamide 6 produced by ring opening polymerization of ε-caprolactam, polyamide 6-6 produced by condensation polymerization of hexamethylenediamine and adipic acid, polyamide 6-10 produced by condensation polymerization of hexamethylenediamine and sebacic acid, polyamide 11 produced by condensation polymerization of e-aminoundecanoic acid, polyamide 12 produced by ring opening polymerization of e-aminolaurolactam, and copolymerized polyamide having 2 or more components among the polyamide described above; polycarbonate based polymers produced by condensation polymerization of, for example, bisphenol A and carbonyl chloride, organic polymers such as diallyl phthalate based polymers. In addition, polysiloxane based polymers such as polydiorganosiloxane can be also used. Among these, saturated hydrocarbon based polymers such as polyisobutylene, hydrogenated polyisoprene, and hydrogenated polybutadiene, polyoxyalkylene based polymers, (meth)acrylic ester based polymers, and polysiloxane based polymers are more preferred since the glass transition temperature is comparably low, and the cured product obtained when used as a curable composition is excellent in cold resistance.

The organic polymer such as saturated hydrocarbon based polymers, polyoxyalkylene based polymers and (meth)acrylic ester based polymers are preferred since staining generated by transfer of low molecular weight components to the adherend material is less likely to occur when used as a base polymer of adhesives and sealants.

Moreover, the polyoxyalkylene based polymer and the (meth)acrylic ester based polymer are particularly preferred since they have high moisture permeability, are superior curability in deep section when used in one-part type compositions, and also superior in adhesiveness. Further, polyoxyalkylene based polymers are most preferred.

The polyoxyalkylene based polymers described above are polymers having a recurring unit represented essentially by the general formula (3):

(wherein, $R^5$ represents a straight or branched alkylene group having 1 to 14 carbon atoms), and $R^5$ in the general formula (3) is preferably a straight or branched alkylene group having 1 to 14 carbon atoms and more preferably a straight or branched alkylene group having 2 to 4 carbon atoms. Specific examples of the recurring unit represented by the general formula (3) include

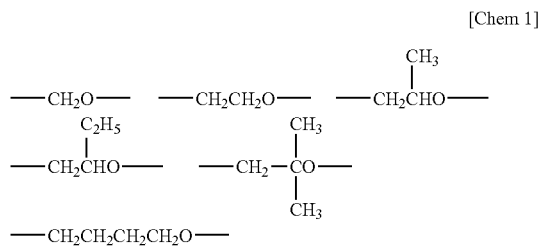

and the like. The main chain skeleton of the polyoxyalkylene based polymer may be constituted with either only one kind of the recurring unit, or two or more kinds of the recurring units. In particular, when the polymer (A) is used as a sealant and the like, it preferably consists of a polymer including a propylene oxide polymer as a principal component, since it is amorphous and has comparably low viscosity.

As the synthesis method of the polyoxyalkylene based polymer, for example: polymerization with an alkaline catalyst such as KOH; polymerization with a transition metal compound-porphyrin complex catalyst such as a complex obtained by allowing an organic aluminum compound to react with porphyrin disclosed in JP-A-61-215623; polymerization with a conjugated metal cyanide complex catalyst disclosed in JP-B-46-27250, JP-B-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,427,335 and the like; polymerization with a catalyst constituted with a polyphosphazene salt illustrated in JP-A-10-273512; polymerization by using a catalyst constituted with a phosphazene compound illustrated in JP-A-11-060722, and the like may be exemplified, but not particularly limited thereto.

As the method for production of the polyoxyalkylene based polymer including a reactive silicon group having a hydrolyzable group other than fluorine for use in producing the polymer (A), those disclosed in each publication of JP-B-45-36319 and 46-12154, JP-A-50-156599, 54-6096, 55-13767, 55-13468 and 57-164123, JP-B-3-2450, U.S. Pat. No. 3,632,557, U.S. Pat. No. 4,345,053, U.S. Pat. No. 4,366,307, U.S. Pat. No. 4,960,844 and the like, as well as methods for production of a polyoxyalkylene based polymer having a high molecular weight (the number average molecular weight of no lower than 6,000) and a narrow molecular weight distribution (Mw/Mn is no greater than 1.6) disclosed in each publication of JP-A-61-197631, 61-215622, 61-215623 and 61-218632, JP-A-3-72527, JP-A-3-47825, JP-A-8-231707 may be exemplified, but not particularly limited thereto.

The saturated hydrocarbon based polymer is a polymer not substantially including a carbon-carbon unsaturated bond other than an aromatic ring, and the polymer having such a skeleton can be obtained by a method in which (1) an olefin based compound having 2 to 6 carbon atoms such as ethylene, propylene, 1-butene or isobutylene is polymerized as a main monomer, or (2) a diene based compound such as butadiene or isoprene is homopolymerized, or the diene based compound is copolymerized with the aforementioned olefin based compound, followed by hydrogenation. Of these, isobutylene based polymers and hydrogenated polybutadiene based polymers are preferred since a functional group can be readily introduced at the end, the molecular weight can be readily controlled, and the number of the terminal functional groups can be increased. Furthermore, isobutylene based polymers are particularly preferred.

The polymer (A) in which the main chain skeleton is a saturated hydrocarbon based polymer, and the cured product thereof are characterized by superior heat resistance, weather resistance, durability, and, moisture barrier properties.

In the isobutylene based polymer, all monomer units may be formed with an isobutylene unit, or a copolymer with other monomer is also acceptable. However, in light of the rubber characteristics, those including a recurring unit derived from isobutylene at the content of no less than 50% by weight are preferred, those including a recurring unit derived from isobutylene at the content of no less than 80% by weight are more preferred, and those including a recurring unit derived from isobutylene at the content of 90 to 99% by weight are particularly preferred.

As the synthesis method of saturated hydrocarbon based polymers, conventionally, various types of polymerization methods have been reported, and particularly in recent years, many living polymerization, generally referred to, has been developed. In the case of the saturated hydrocarbon based polymers, particularly in the case of isobutylene based polymers, inifer polymerization found by Kennedy et al., (J. P. Kennedy et al., J. Polymer Sci., Polymer Chem. Ed., 1997, Vol. 15, p. 2843) may be used, whereby the polymer can be readily produced. Accordingly, it is known that the polymerization is enabled to give the polymers having a molecular weight of approximately 500 to 100,000, with a molecular weight distribution of no greater than 1.5, and various types of functional groups can be introduced at the end of the molecules.

The method for producing the saturated hydrocarbon based polymer including a reactive silicon group having a hydrolyzable group other than fluorine for use in producing the polymer (A) is disclosed in, each specification of, for example, JP-B-4-69659, JP-B-7-108928, JP-A-63-254149, JP-A-64-22904, JP-A-1-197509, Japanese Patent No. 2539445, Japanese Patent No. 2873395, JP-A-7-53882, and the like, but not particularly limited thereto.

The (meth)acrylic ester based monomer that constitutes the (meth)acrylic ester based polymer main chain is not particularly limited, and various types of those may be used. Illustrative examples include (meth)acrylic ester based monomers such as (meth)acrylic acid, methyl(meth)acrylate, ethyl (meth)acrylate, n-propyl(meth)acrylate, isopropyl(meth) acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, toluoyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, γ-(methacryloyloxypropyl)trimethoxysilane, γ-(methacryloyloxypropyl)dimethoxymethylsilane, ethylene oxide adducts of (meth)acrylic acid, trifluoromethylmethyl (meth)acrylate, 2-trifluoromethylethyl(meth)acrylate, 2-perfluoroethylethyl(meth)acrylate, 2-perfluoroethyl-2-perfluorobutylethyl(meth)acrylate, perfluoroethyl(meth)acrylate, trifluoromethyl(meth)acrylate, bis(trifluoromethylmethyl) (meth)acrylate, 2-trifluoromethyl-2-perfluoroethylethyl (meth)acrylate, 2-perfluorohexylethyl(meth)acrylate, 2-perfluorodecylethyl(meth)acrylate, 2-perfluorohexadecylethyl (meth)acrylate, and the like.

In the (meth)acrylic ester based polymer, the following vinyl based monomer can be also copolymerized together with the (meth)acrylic ester based monomer. Illustrative examples of the vinyl based monomer include styrene based monomers such as styrene, vinyltoluene, α-methylstyrene, chlorostyrene and styrenesulfonic acid, and salts thereof; fluorine-containing vinyl monomers such as perfluoroethylene, perfluoropropylene, and vinylidene fluoride; silicon-containing vinyl based monomers such as vinyltrimethoxysilane, and vinyltriethoxysilane; maleic anhydride, maleic acid, and monoalkyl esters and dialkyl esters of maleic acid; fumaric acid, and monoalkyl esters and dialkyl esters of fumaric acid; maleimide based monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl based monomers such as acrylonitrile and methacrylonitrile; amide group-containing vinyl based monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, and the like.

These vinyl based monomers may be used alone, or multiple types thereof may be copolymerized. In particular, in light of the physical properties of the resulting polymer, copolymers constituted with a styrene based monomer and a (meth)acrylic ester based monomer are preferred. The (meth)acrylic polymers constituted with an acrylic ester monomer and a methacrylic ester monomer are more preferred, and acrylic polymers constituted with an acrylic ester monomer are particularly preferred. When the polymer (A) is used in applications for common constructions and the like, butyl acrylate based monomers are more preferred since physical properties such as low viscosity of the blend, low modulus of the cured product, high elongation, weather resistance, heat resistance and the like are demanded. Whereas, in applications such as applications for automobiles in which oil resistance and the like are demanded, copolymers predominantly constituted with ethyl acrylate are more preferred. Although such polymers predominantly constituted with ethyl acrylate are superior in the oil resistance, they tend to be somewhat inferior in the low temperature characteristics (cold resistance), and thus a part of the ethyl acrylate may be substituted with butyl acrylate for improving the low temperature characteristics. However, as the proportion of butyl acrylate is increased, favorable oil resistance of the same may be deteriorated, therefore, the proportion of the same is preferably no greater than 40% by mole, and more preferably no greater than 30% by mole when the applications require oil resistance. Moreover, in order to improve the low temperature characteristics and the like without impairing the oil resistance, 2-methoxyethyl acrylate having oxygen introduced the alkyl group of the side chain, 2-ethoxyethyl acrylate and the like may also be preferably used. However, since heat resistance is likely to be deteriorated by introducing an alkoxy group having an ether linkage in the side chain, the proportion is preferably no greater than 40% by mole when heat resistance is needed. Taking into consideration the required physical properties such as oil resistance and heat resistance, as well as low temperature characteristics and the like to meet various types of applications and demanded objects, the proportion may be changed, whereby an appropriate polymer can be obtained. For example, although not limited thereto, copolymers of ethyl acrylate/butyl acrylate/2-methoxyethyl acrylate (molar ratio being 40-50/20-30/30-20) may be exemplified as examples that provide superior balance of physical properties such as oil resistance, heat resistance, and low temperature characteristics. In the present invention, these preferable monomers may be copolymerized with other monomer, or may be also subjected block copolymerization. In such cases, it is preferred that these preferable monomers be included in an amount of no less than 40% in terms of the weight ratio. In the foregoing description, for example, (meth)acrylic acid represents acrylic acid and/or methacrylic acid.

The synthesis method of the (meth)acrylic ester based polymer is not particularly limited, and any known method may be employed. However, polymers obtained by a common free radical polymerization method in which an azo based compound, peroxide or the like is used as a polymerization initiator generally have a value of the molecular weight distribution as great as no less than 2, and thus problems of increase in the viscosity may be involved. Therefore, living radical polymerization method is preferably employed in order to obtain a (meth)acrylic ester based polymer having low molecular weight distribution and low viscosity, and has crosslinkable functional groups at a high proportion in the molecular chain at the end.

Of the "living radical polymerization method", "atom transfer radical polymerization method" in which a (meth)acrylic ester based monomer is polymerized using an organic halide or halogenated sulfonyl compound or the like as an initiator, and a transition metal complex as a catalyst is more preferred as a method for production of a (meth)acrylic ester based polymer having a specified functional group due to halogen or the like, included at the end, which serves comparatively advantageously in a functional group transformation reaction, and a great degree of freedom in designing the initiator and the catalyst, in addition to the features of the "living radical polymerization method" as described above. Such atom transfer radical polymerization method is described in, for example, Matyjaszewski et al., J. Am. Chem. Soc., 1995, Vol. 117, p. 5614, and the like.

As the production method of a (meth)acrylic ester based polymer including a reactive silicon group having a hydrolyzable group other than fluorine for use in the production of the polymer (A), for example, in JP-B-3-14068, JP-B-4-55444, JP-A-6-211922 and the like, production methods in which a free radical polymerization method carried out using a chain transfer agent have been disclosed. In addition, JP-A-9-272714 and the like disclose production methods in which an atom transfer radical polymerization method is used, however, the production method is not limited thereto in particular.

As described above, the polymer (A) of the present invention may have any one main chain skeleton among the aforementioned various types of main chain skeletons, or may be a mixture of polymers having different main chain skeletons. Specifically, polymers prepared by blending two or more selected from the group consisting of polyoxyalkylene based polymers having a reactive silicon group, saturated hydrocarbon based polymers having a reactive silicon group, (meth)acrylic ester based polymers having a reactive silicon group are also included in the polymer (A) of the present invention.

The method for production of the polymer that includes a polyoxyalkylene based polymer including a reactive silicon group having a hydrolyzable group other than fluorine, blended with a (meth)acrylic ester based polymer including a reactive silicon group having a hydrolyzable group other than fluorine is disclosed in JP-A-59-122541, JP-A-63-112642, JP-A-6-172631, JP-A-11-116763, and the like, but not particularly limited thereto. Preferable specific examples include a method for production in which a copolymer which has a reactive silicon group, and a molecular chain substantially composed of a (meth)acrylic ester monomer unit including an alkyl group having 1 to 8 carbon atoms represented the following general formula (4):

(wherein, $R^6$ represents a hydrogen atom or a methyl group, and $R^7$ represents an alkyl group having 1 to 8 carbon atoms), and a (meth)acrylic ester monomer unit including an alkyl group having no less than 10 carbon atoms represented by the following general formula (5):

(wherein, $R^6$ is as defined above, and $R^8$ represents an alkyl group having no less than 10 carbon atoms) is blended with a polyoxyalkylene based polymers having a reactive silicon group.

Examples of $R^7$ in the above general formula (4) include e.g., alkyl groups having 1 to 8 carbon atoms, preferably 1 to 4 carbon atoms, and more preferably 1 or 2 carbon atoms such as a methyl group, an ethyl group, a propyl group, an n-butyl group, a t-butyl group, a 2-ethylhexyl group, and the like. The alkyl group as $R^7$ may be present either alone, or two or more of them may be also present as a mixture.

Examples of $R^8$ in the above general formula (5) include e.g., long chain alkyl groups having no less than 10 carbon atoms, generally 10 to 30 carbon atoms, and preferably 10 to 20 carbon atoms such as a lauryl group, a tridecyl group, a cetyl group, a stearyl group, a behenyl group, and the like. The alkyl group as $R^8$ may be present either alone, or two or more of them may be also present as a mixture.

The molecular chain of the (meth)acrylic ester based copolymer is substantially constituted with monomer units represented by the general formula (4) and the general formula (5), but the term "substantially" referred to herein means that the monomer units represented by the general formula (4) and the general formula (5) are present beyond 50% by weight in total in the copolymer. The total amount of the monomer units represented by the general formula (4) and the general formula (5) is preferably no less than 70% by weight.

Also, the weight ratio of the monomer unit represented by the general formula (4) and the monomer unit represented by the general formula (5) being present is preferably 95:5 to 40:60, and more preferably 90:10 to 60:40.

The monomer unit other than those represented by the general formula (4) and the general formula (5) which may be included in the copolymer may be, for example, a member of acrylic acids such as acrylic acid or methacrylic acid; a monomer including an amide group such as N-methylolacrylamide or N-methylolmethacrylamide, an epoxy group such as glycidyl acrylate or glycidyl methacrylate, a nitrogen-containing group such as diethylaminoethyl acrylate, diethylaminoethyl methacrylate; as well as a monomer unit resulting from acrylonitrile, styrene, α-methylstyrene, alkylvinyl ether, vinyl chloride, vinyl acetate, vinyl propionate, ethylene or the like.

The polymer that includes a saturated hydrocarbon based polymer including a reactive silicon group having a hydrolyzable group other than fluorine, blended with a (meth)acrylic ester based copolymer including a reactive silicon group having a hydrolyzable group other than fluorine is disclosed in JP-A-1-168764, JP-A-2000-186176, and the like but not particularly limited thereto.

In addition, as other method for production by blending (meth)acrylic ester based copolymers including a reactive silicon functional group having a hydrolyzable group other than fluorine, a method in which polymerization of a (meth) acrylic ester based monomer is carried out in the presence of a polymer including a reactive silicon group having a hydrolyzable group other than fluorine can be used. Such a method for production is specifically disclosed in each publication of JP-A-59-78223, JP-A-59-168014, JP-A-60-228516, JP-A-60-228517 and the like, but not limited thereto.

Herein, other component such as a urethane-bond component may be included in the main chain skeleton of the polymer (A) of the present invention as long as the advantageous effects of the present invention are not largely damaged.

The urethane-bond component is not particularly limited, and an example thereof is a group generated by allowing an isocyanate group to react with an active hydrogen group (hereinafter, may be also referred to as amide segment).

The amide segment is a group represented by the following general formula (6):

($R^9$ represents a hydrogen atom or a substituted or unsubstituted organic group).

Specific examples of the amide segment include urethane groups generated by a reaction of an isocyanate group and a hydroxyl group; urea groups generated by a reaction of an isocyanate group and an amino group; thiourethane groups generated by a reaction of an isocyanate group and a mercapto group, and the like. Additionally, according to the present invention, groups generated by a reaction of active hydrogen in the urethane group, urea group, or thiourethane group with an isocyanate group are also included in the groups represented by the general formula (6).

In an illustrative example of industrially available method for production of the polymer including the amide segment and a reactive silicon group having a hydrolyzable group other than fluorine, the polymer having an active hydrogen-containing group at the end is allowed to react with an excess polyisocyanate compound to give a polymer having an isocyanate group at the end of the polyurethane based main chain, thereafter or concurrently therewith, all or a part of the isocyanate groups are allowed to react with a "U" group of a silicon compound represented by the following general formula (7):

(wherein, $R^3$, Y, d are as defined in the above general formula (2). $R^{10}$ represents a bivalent organic group, and more preferably a substituted or unsubstituted bivalent hydrocarbon group having 1 to 20 carbon atoms. U represents an active hydrogen-containing group selected from a hydroxyl group, a carboxyl group, a mercapto group, and a nonsubstituted or monosubstituted amino group) to produce the polymer. Illustrative examples of known production methods of the polymer in connection with the method for production include those disclosed in JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP0676403), JP-A-10-204144 (EP0831108), JP-A-No. 2003-508561 (Japanese Translation of PCT Application) (U.S. Pat. No. 6,197,912), JP-A-6-211879 (U.S. Pat. No. 5,364,955), JP-A-10-53637 (U.S. Pat. No. 5,756,751), JP-A-11-100427, JP-A-2000-169544, JP-A-2000-169545, JP-A-2002-212415, Japanese Patent No. 3313360, U.S. Pat. No. 4,067,844, U.S. Pat. No. 3,711,445, JP-A-2001-323040, and the like.

In addition, in the method for production, the polymer having an active hydrogen-containing group at the end may be allowed to react with a reactive silicon group having a hydrolyzable group other than a fluorine-containing isocyanate compound represented by the following general formula (8):

$$O=C=N-R^{10}-SiR^3_{3-d}Y_d \quad (8)$$

(wherein, $R^3$, $R^{10}$, Y, and d are as defined in the above general formulae (2) and (7)) to produce the polymer. Illustrative examples of known production methods of the polymer in connection with the method for production include those disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, JP-A-2002-155145, JP-A-2002-249538, WO03/018658, WO03/059981, and the like.

Examples of the polymer having an active hydrogen-containing group at the end include oxyalkylene polymers having a hydroxyl group at the end (polyether polyol), polyacryl polyol, polyester polyol, saturated hydrocarbon based polymers having a hydroxyl group at the end (polyolefin polyol), polythiol compounds, polyamine compounds, polyalkyleneimine, polysiloxane, and the like. Among these, polyether polyol, polyacryl polyol, polyolefin polyol, and polysiloxane are preferred since the resulting polymer will have a comparatively low glass transition temperature, and thus, the resulting cured product is superior in cold resistance. In particular, polyether polyol is particularly preferred since the resulting polymer will have a comparatively low viscosity with favorable workability, and favorable deep section curability. In addition, polyacryl polyol and the saturated hydrocarbon based polymer are more preferred since the cured product of the resulting polymer will have favorable weather resistance and heat resistance.

Although the polyether polyol which can be used may be those produced by any method for production, ones having at least 0.7 hydroxyl groups at the end on average of the all molecules per molecular end are preferred. Specifically, oxyalkylene polymers produced using a conventional alkali metal catalyst, as well as oxyalkylene polymers produced by allowing alkylene oxide to react in the presence of a conjugated metal cyanide complex or cesium, using a polyhydroxy compound having at least two hydroxyl groups or the like as an initiator, and the like may be exemplified.

Of the aforementioned each polymerization method, the polymerization method in which a conjugated metal cyanide complex is used is preferable since an oxyalkylene polymer with lower degree of unsaturation, small Mw/Mn and lower viscosity, also with high acid resistance and high weather resistance can be obtained.

Examples of the polyacryl polyol include polyols including an alkyl(meth)acrylate (co)polymer as a skeleton, and having a hydroxyl group within the molecule. The synthesis method of this polymer is preferably a living radical polymerization which enables narrowing of the molecular weight distribution and lowering of viscosity, and an atom transfer radical polymerization is more preferred. Also, to use a polymer by a SGO process, generally referred to, which was obtained by continuous bulk polymerization of an alkyl acrylate monomer at a high temperature and a high pressure as disclosed in JP-A-2001-207157 is preferred. Specifically, UH-2000, manufactured by Toagosei Co., Ltd., and the like may be exemplified.

Specific examples of the polyisocyanate compound include aromatic polyisocyanate such as toluene (tolylene) diisocyanate, diphenylmethane diisocyanate, and xylylene diisocyanate; aliphatic polyisocyanate such as isophorone diisocyanate, and hexamethylene diisocyanate, and the like.

The silicon compound represented by the above general formula (7) is not particularly limited, but specifically, illustrative examples include amino group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silanes such as γ-hydroxypropyltrimethoxysilane; mercapto group-containing silanes such as γ-mercaptopropyltrimethoxysilane; and the like. In addition, as disclosed in JP-A-6-211879 (U.S. Pat. No. 5,364,955), JP-A-10-53637 (U.S. Pat. No. 5,756,751), JP-A-10-204144 (EP0831108), JP-A-2000-169544, and JP-A-2000-169545, Michael addition reactant of various types of α,β-unsaturated carbonyl compounds with amino group-containing silane, or Michael addition reactant of various types of (meth)acryloyl group-containing silane with an amino group-containing compound can be also used as the silicon compound represented by the general formula (7).

The reactive silicon group-containing isocyanate compound represented by the above general formula (8) is not particularly limited, but specifically, illustrative examples include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, dimethoxymethylsilylmethylisocyanate, and the like. Additionally, as is disclosed in JP-A-2000-119365 (U.S. Pat. No. 6,046,270), a compound obtained by allowing the silicon compound represented by the general formula (7) to react with an excess polyisocyanate compound can be also used as the reactive silicon group-containing isocyanate compound represented by the general formula (8).

When the polymer (A) of the present invention includes many amide segments in the main chain skeleton, the viscosity of the polymer tends to be high. Moreover, the viscosity may be elevated after the storage, and thus the workability of the resulting composition may be lower. Therefore, in order to obtain a composition that is superior in storage stability and workability, it is preferred that the amide segment not be substantially included. To the contrary, the curability is likely to be improved by the amide segment included in the main chain skeleton of the polymer (A). Therefore, when the amide segment is included in the main chain skeleton of the polymer (A), the amide segment is included preferably 1 to 10 segments, more preferably 1.5 to 5 segments, and particularly preferably 2 to 3 segments per molecule, on average. When less than 1 segment is included, the curability may not be sufficient, to the contrary, when more than 10 segments are included, the polymer may have a high viscosity, thereby leading to difficulties in handling.

In addition, among the polymers produced using the compound represented by the general formula (7) or the general formula (8) with the method described above, the polymer constituted with the compound in which $R^{10}$ represents —$CH_2$-tends to achieve particularly superior curability.

Curable Composition

Next, the curable composition of the present invention including the polymer (A) is described in detail. The curable composition of the present invention may include the aforementioned polymer (A) alone as the resin component having a silicon-containing group (reactive silicon group) which can be crosslinked by forming a siloxane bond, or alternatively, the polymer (B), which is a polymer including a reactive silicon group having only hydrolyzable group other than fluorine as a hydrolyzable group described below, may be included together with the polymer (A). In the curable composition of the present invention, the polymer (A) has not only a function to improve the curability of the curable composition when the curable composition includes only the polymer (A) as the resin component having a silicon-containing group (reactive silicon group) which can be crosslinked by forming a siloxane bond, but also a function to improve the curability of the entirety of the curable composition when the curable composition includes both the polymer (A) and the polymer (b).

The polymer (B) herein is a polymer having a silicon group represented by the following general formula (2):

$$—SiR^3{}_{3-d}Y_d \qquad (2)$$

(wherein, $R^3$ each independently represents a hydrocarbon group having 1 to 20 carbon atoms, or an organosiloxy group represented by: $R^4{}_3SiO—$ (wherein $R^4$ each independently represents a hydrocarbon group having 1 to 20 carbon atoms). Also, Y each independently represents a hydroxyl group or a hydrolyzable group other than fluorine. d is any one of 1, 2, or 3), in a quantity of one or more per molecule, on average.

The hydrolyzable group of the polymer (B) is not particularly limited, and conventionally known hydrolyzable groups may be employed. Specific examples include a hydrogen atom, halogen atoms other than fluorine, alkoxy groups, acyloxy groups, ketoxymate groups, amino groups, amide groups, acid amide groups, aminooxy groups, mercapto groups, alkenyloxy groups, and the like. Among these, a hydrogen atom, alkoxy groups, acyloxy groups, ketoxymate groups, amino groups, amide groups, aminooxy groups, mercapto groups and alkenyloxy groups are preferred, and in light of mild hydrolyzability and ease in handling, alkoxy groups are particularly preferred.

When two or more hydrolyzable groups or hydroxyl groups are present in one reactive silicon group, they may be the same or different.

In addition, specific examples of $R^3$ in the above general formula (1) include e.g., alkyl groups such as a methyl group and an ethyl group, cycloalkyl groups such as a cyclohexyl group, aryl groups such as a phenyl group, aralkyl groups such as a benzyl group, triorganosiloxy groups represented by $R^4{}_3SiO—$, wherein $R^4$ is a methyl group, a phenyl group or the like, and the like. Among these, a methyl group is particularly preferred.

More specifically, illustrative examples of the reactive silicon group of the polymer (B) include a trimethoxysilyl group, a triethoxysilyl group, a triisopropoxysilyl group, a dimethoxymethylsilyl group, a diethoxymethylsilyl group, a diisopropoxymethylsilyl group, a methoxydimethylsilyl group, and an ethoxydimethylsilyl group. Since they have a high activity to give a good curability, a trimethoxysilyl group, a triethoxysilyl group, and a dimethoxymethylsilyl group are more preferred, and a trimethoxysilyl group is particularly preferred. Additionally, in light of the storage stability, a dimethoxymethylsilyl group is particularly preferred. A triethoxysilyl group is particularly preferred since the alcohol generated with the hydrolysis reaction of the reactive silicon group is ethanol, thereby achieving a higher level of safety.

Also, polymers having a reactive silicon group in which three hydrolyzable groups are included on one silicon atom are preferred since high curability can be achieved, and curable compositions having favorable recovery property, durability and creep resistance are more likely to be provided.

The reactive silicon group may be introduced into the polymer (B) by any known method. More specifically, for example, the following methods may be exemplified.

(4) A polymer having a functional group such as a hydroxyl group in the molecule is allowed to react with an organic compound, which has an active group reactive to this functional group, and unsaturated group, to obtain a polymer having an unsaturated group. Alternatively, copolymerization with an unsaturated group-containing epoxy compound yields an unsaturated group-containing polymer. Subsequently, hydrosilane having a reactive silicon group is allowed to act on the resulting reaction product to carry out hydrosilylation.

(5) A polymer having an unsaturated group obtained in a similar manner to the method (4) is allowed to react with a compound having a mercapto group and a reactive silicon group.

(6) A polymer having a functional group such as a hydroxyl group, an epoxy group or an isocyanate group in the molecule is allowed to react with a compound having a functional group reactive to this functional group, and a reactive silicon group.

In the method (4) or the method (6) among the foregoing methods, the method in which a polymer having a hydroxyl group at the end is allowed to react with a compound having an isocyanate group and a reactive silicon group is preferred since a high conversion rate can be achieved within a comparatively short reaction time period. Furthermore, the method (4) is particularly preferred since a polymer having a reactive silicon group obtained by the method (4) forms a curable composition with lower viscosity and more favorable workability as compared with the polymer obtained by the method (6), and the polymer obtained by the method (5) may have strong odor resulting from mercaptosilane.

Specific examples of the hydrosilane compound used in the method (4) include e.g., chlorosilanes such as trichlorosilane, dichloromethylsilane, chlorodimethylsilane, and dichlorophenylsilane; alkoxysilanes such as trimethoxysilane, triethoxysilane, dimethoxymethylsilane, diethoxymethylsilane, dimethoxyphenylsilane, ethyldimethoxysilane, methoxydimethylsilane, and ethoxydimethylsilane; acyloxysilanes such as diacetoxymethylsilane, and diacetoxyphenylsilane; ketoxymate silanes such as bis(dimethylketoxymate)methylsilane, and bis(cyclohexylketoxymate)methylsilane, but not limited thereto. Of these, chlorosilanes, and alkoxysilanes are particularly preferred, and in particular, alkoxysilanes are most preferred since the resulting curable composition exhibits mild hydrolyzability and can be easily handled. Among alkoxysilanes, dimethoxymethylsilane is particularly preferred since it is readily available, and the curable composition including the resulting polymer has high curability, and superior storage stability, elongation characteristics and high tensile strength.

Among the hydrosilane compounds, the hydrosilane compound represented by the following general formula (9):

$$H—SiY_3 \qquad (9)$$

(wherein, Y is as defined in the above general formula (2)) is preferred since a curable composition including the polymer (B) obtained by an addition reaction of a hydrosilane compound is superior in the curability. Among the hydrosilane compounds represented by the general formula (9), trialkoxysilanes such as trimethoxysilane, triethoxysilane, and triisopropoxysilane are more preferred.

Among the trialkoxysilanes, trialkoxysilanes including an alkoxy group having 1 carbon atom (methoxy group) such as trimethoxysilane may lead to quick progress of the disproportionation reaction, and an extremely highly reactive compound such as dimethoxysilane may be generated when the disproportionation reaction proceeds. In light of safety in handling, to use trialkoxysilane having an alkoxy group having no less than 2 carbon atoms represented by the general formula (10):

(10)

(wherein, three symbols $R^{11}$ each independently represent an organic group having 2 to 20 carbon atoms) is preferred. In light of availability, and safety in handling, triethoxysilane is most preferred.

As the synthesis method (5), for example, a method in which a compound having a mercapto group and a reactive silicon group is introduced into an unsaturated bond site of a polymer in the presence of a radical initiator and/or a radical generation source by a radical addition reaction, and the like may be exemplified, but not particularly limited thereto. Specific examples of the compound having a mercapto group and a reactive silicon group include e.g., γ-mercaptopropyltrimethoxysilane, γ-mercaptopropyldimethoxymethylsilane, γ-mercaptopropyltriethoxysilane, γ-mercaptopropyldiethoxymethylsilane, mercaptomethyltriethoxysilane, and the like, but not limited thereto.

In the synthesis method (6), as the method in which the polymer having a hydroxyl group at the end is allowed to react with the compound having an isocyanate group and a reactive silicon group, for example, a method disclosed in JP-A-3-47825, and the like may be exemplified, but not particularly limited thereto. Specific examples of the compound having an isocyanate group and a reactive silicon group include e.g., γ-isocyanatepropyltrimethoxysilane, γ-isocyanatepropyldimethoxymethylsilane, γ-isocyanatepropyltriethoxysilane, γ-isocyanatepropyldiethoxymethylsilane, isocyanatemethyltrimethoxysilane, isocyanatemethyltriethoxysilane, isocyanatemethyldimethoxymethylsilane, isocyanatemethyldiethoxymethylsilane and the like, but not limited thereto.

As described above, silane compounds in which three hydrolyzable groups are bonded to one silicon atom such as trimethoxysilane may lead to progress of the disproportionation reaction. When the disproportionation reaction proceeds, fairly dangerous compounds such as dimethoxysilane may be generated. However, γ-mercaptopropyltrimethoxysilane, γ-isocyanatepropyltrimethoxysilane and the like do not lead to progress of such a disproportionation reaction. Thus, when a group in which three hydrolyzable groups are bound to one silicon atom such as trimethoxysilyl group is used as the silicon-containing group, the synthesis method (5) or (6) may be preferably used.

In order to obtain a rubbery cured product which exhibits high strength, great elongation and low modulus of elasticity, the number of the reactive silicon groups present in the polymer (B) may be at least one, and preferably 1.1 to 5 on average per molecule of the polymer. When the number of the reactive silicon groups on average included in one molecule is less than 1, favorable rubber elastic behavior can be less likely to be exhibited. In contrast, when the number of the reactive silicon groups included in one molecule is more than 5 on average, the elongation of the rubbery cured product may be reduced. As described above, the reactive silicon group may be present either at the end of the main chain, or at the end of the side chain of the polymer molecular chain, or incorporated in the main chain. However, in particular, when it is present at the end of the main chain, effective mesh size of the network of the organic polymer component included in the cured product formed finally can be increased, therefore, a rubbery cured product that exhibits high strength and great elongation with low modulus of elasticity is more likely to be obtained. When two or more reactive silicon groups are present in one molecule, each reactive silicon group may be the same or different.

The main chain skeleton of the polymer (B) and the synthesis method of the same can be explained similarly to those of the polymer (A). Moreover, the method for production of the polymer (B) is similar to the method referred to as the method for production of "polymer including a reactive silicon group having a hydrolyzable group other than fluorine" in the description of the polymer (A) described in the foregoing.

The polymer (B) may be straight or branched, and the number average molecular weight is preferably approximately 3,000 to 100,000, more preferably 3,000 to 50,000, and particularly preferably 3,000 to 30,000, in terms of the polystyrene equivalent measured with GPC. When the number average molecular weight is less than 3,000, the cured product may be unfavorable in regard to the elongation characteristics. To the contrary, when the number average molecular weight is greater than 100,000, too high viscosity is likely to lead to disadvantages in terms of the workability.

When the polymer (A) and the polymer (B) are included in the curable composition of the present invention, the upper limit of the content of the polymer (B) in terms of the weight ratio of polymer (B)/polymer (A) is preferably no greater than 99/1, more preferably no greater than 95/5, and still more preferably no greater than 50/50. To the contrary, the lower limit of the ratio, polymer (B)/polymer (A), based on the weight is preferably greater than 0/100. When the ratio of the polymer (A) is below this ratio, sufficient effect of accelerating the curing speed may not be achieved.

When the curable composition of the present invention includes both the polymer (A) and the polymer (B), the main chain skeletons of the polymer (A) and the polymer (B) may be the same or different, and may be either single main chain skeleton each, or mixed two or more kinds of the main chain skeletons which are preferably miscible with each other.

The curable composition of the present invention may further include a curing catalyst. The curing catalyst plays a role in accelerating the reaction of the reactive silicon groups of the polymer (A) and the polymer (B) to permit hydrolysis and condensation, and allow for crosslinking.

As the curing catalyst, known various types of catalysts such as an organic tin compound, a metal carboxylate, an amine compound, a carboxylic acid, an alkoxy metal, or an inorganic acid can be used. However, since influences on the environment are concerned over the organic tin compounds as described above, a nonorganic tin based compound is preferably used as the curing catalyst. In particular, an amine compound is preferably used as the curing catalyst since the curable composition of the present invention can be rapidly cured irrespective of being a nonorganic tin catalyst.

The amine compound which can be used as a curing catalyst of the present invention also includes nitrogen-containing cyclic compounds such as pyridine. Specifically, illustrative examples of the amine compound include aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine, and oleylamine;

aromatic amines such as aniline, laurylaniline, stearylaniline, and triphenylamine; heterocyclic compounds such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidine methanol, 2-(2-piperidino)ethanol, piperidone, 1,2-dimethyl-1,4,5,6-tetrahydropyrimidine, 1,8-diazabicyclo(5,4,0)undecene-7 (DBU), 6-(dibutylamino)-1,8-diazabicyclo(5,4,0)undecene-7 (DBA-DBU), 1,5-diazabicyclo(4,3,0)nonene-5 (DBN), 1,4-diazabicyclo(2,2,2)octane (DABCO), and aziridine, and, as other amines, amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperazinyl)ethylamine, xylylenediamine, and 2,4,6-tris(dimethylaminomethyl)phenol; guanidines such as guanidine, and diphenylguanidine; biguanides such as butylbiguanide, 1-o-tolylbiguanide and 1-phenylbiguanide, and the like, but not limited thereto.

Among all, amidines such as 1,2-dimethyl-1,4,5,6-tetrahydropyrimidine, DBU, DBA-DBU, and DBN; guanidines such guanidine, and diphenylguanidine; biguanides such as butylbiguanide, 1-o-tolylbiguanide and 1-phenylbiguanide are preferred since they exhibit high activities. Furthermore, aryl-substituted biguanides such as 1-o-tolylbiguanide and 1-phenylbiguanide are preferred since they exhibit superior adhesiveness.

Furthermore, although amine compounds are basic, amine compounds having a pKa value for the conjugate acid of no less than 11 are preferred since they exhibit high catalyst activities. In particular, 1,2-dimethyl-1,4,5,6-tetrahydropyrimidine, DBU, DBN and the like having a pKa value for the conjugate acid of no less than 12 are preferred since they exhibit high catalyst activities.

In light of ease of handling and safety, alkylamine having 5 to 20 carbon atoms is preferably used, and alkylamine having 6 to 15 carbon atoms is more preferred. When the number of carbon atoms is less than this range, volatility is likely to be elevated, whereby the odor tends to increase. When the number of carbon atoms is greater than this range, solidification at room temperatures is likely to occur, and thus to provide a miscible state with the polymer (A) and/or the polymer (B) may be difficult. In light of the availability, octylamine, 2-ethylhexylamine, laurylamine, and 3-diethylaminopropylamine are more preferred.

According to the present invention, an amino group-containing silane coupling agent (hereinafter, may be referred to as aminosilane) can also be used as the curing catalyst amine compound. The aminosilane may involve compounds having a group that includes a silicon atom to which (a) hydrolyzable group(s) is/are bound (hereinafter, referred to as hydrolyzable silicon group), and a substituted or unsubstituted amino group. Examples of the substituent of the substituted amino group include an alkyl group, an aralkyl group, and an aryl group. Examples of the hydrolyzable silicon group include the groups represented by the above general formula (2), wherein Y represents a hydrolyzable group. Specifically, groups illustrated as hydrolyzable groups may be exemplified, but a methoxy group, an ethoxy group and the like are preferred in light of the hydrolysis rate. The number of the hydrolyzable groups bound to one silicon atom is preferably no less than 2, and particularly preferably no less than 3.

Specific examples include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidepropyltrimethoxysilane, γ-ureidepropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, and the like.

As the curing catalyst aminosilane, aminosilane having an amino group ($-NH_2$) is preferred in light of the curability, and in light of the availability, γ-aminopropyltrimethoxysilane, γ-aminopropyltriethoxysilane, γ-aminopropylmethyldimethoxysilane, and γ-(2-aminoethyl)aminopropyltrimethoxysilane are preferred.

In addition, ketimine compounds that generate the aforementioned amine compounds by hydrolysis can be also used as the curing catalyst of the present invention.

Specific examples of the curing catalyst other than the amine compound include carboxylic acids such as acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodecanoic acid, and versatic acid; derivatives of the aforementioned carboxylic acids (carboxylic acids anhydrides, esters, amides, nitriles, acyl chlorides); metal carboxylate salts such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, and cerium carboxylate; titanium compounds such as tetrabutyl titanate, tetrapropyl titanate, titaniumtetrakis (acetylacetonato), bis(acetylacetonato)diisopropoxytitanium, and diisopropoxytitanium bis(ethylacetoacetate); organic tin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonato), dibutyltin bis(ethylacetoacetonato), reaction products of dibutyltin oxide with a silicate compound, and reaction products of dibutyltin oxide and a phthalic acid ester; aluminum compounds such as aluminum tris(acetylacetonato), aluminum tris(ethylacetoacetate), and diisopropoxyaluminum ethylacetoacetate; zirconium compounds such as zirconium tetrakis (acetylacetonato); various types of metal alkoxides such as tetrabutoxy hafnium; organic acidic phosphoric acid esters; organic sulfonic acids such as trifluoromethanesulfonic acid;

inorganic acids such as hydrochloric acid, phosphoric acid, and boronic acid. For the grounds described above and the like, the amount of the organic tin compound used is preferably no greater than 5 parts by weight, more preferably no greater than 0.5 parts by weight, and still more preferably no greater than 0.05 parts by weight based on 100 parts by weight of the polymer (A), or based on 100 parts by weight of total amount of the polymer (A) and the polymer (B) when the curable composition includes the polymer (A) and the polymer (B). It is particularly preferred that the organic tin compound is not included.

In the curable composition of the present invention, two or more kinds of the curing catalyst may be used in combination.

The amount of the curing catalyst used is preferably approximately 0.001 to 20 parts by weight, and still more preferably 0.01 to 10 parts by weight based on 100 parts by weight of the polymer (A), or based on 100 parts by weight of total amount of the polymer (A) and the polymer (B) when the curable composition includes the polymer (A) and the polymer (B). When the amount of the curing catalyst blended is below this range, sufficient curing speed may not be attained, and the catalyst activity may be deteriorated after the storage. To the contrary, when the amount of the curing catalyst blended is beyond this range, usable time may be so short that the workability may be deteriorated.

The curable composition of the present invention may include a silane coupling agent as an adhesion-imparting agent. The silane coupling agent herein referred to is a compound having a hydrolyzable silicon group and other functional group in the molecule, and when it is used on various types of adherends, i.e., inorganic materials such as glass, aluminum, stainless, zinc, copper and mortar, and organic materials such as polyvinyl chloride, acryl, polyester, polyethylene, polypropylene and polycarbonate, marked effects of improving adhesiveness are exhibited under non-primer conditions or primer treated conditions. When used under non-primer conditions, the effect of improving the adhesiveness on the various types of adherends may be particularly prominently exhibited. Such silane coupling agents can serve as a physical property adjustor, a dispersibility-improving agent of inorganic fillers, and the like. Additionally, by using the silane coupling agent in the present invention, the curability may be further improved in some cases.

Examples of the hydrolyzable silicon group of the silane coupling agent include the groups represented by the above general formula (2), wherein Y represents a hydrolyzable group. Specifically, groups exemplified above as the hydrolyzable group may be included, and a methoxy group, an ethoxy group and the like are preferred in light of the hydrolysis rate. The number of the hydrolyzable group bound to one silicon atom is no less than 2, and particularly preferably no less than 3.

Illustrative examples of the functional group other than the hydrolyzable silicon group include substituted or unsubstituted amino groups, mercapto groups, epoxy groups, carboxyl groups, vinyl groups, isocyanate groups, isocyanurate, halogen, and the like. Of these, substituted or unsubstituted amino groups, epoxy groups, isocyanate groups, isocyanurate and the like are preferred because of superior effect of improving the adhesiveness, and amino groups are particularly preferred.

Although the silane coupling agents having both a hydrolyzable silicon group and an amino group are generally referred to as aminosilane, aminosilane also serves as a curing catalyst in the present invention as described above. Therefore, specific examples of aminosilane are referred to in the description of the curing catalyst herein. In addition, when achieving a greater function as an adhesion-imparting agent is desired, the aminosilane may be used in an amount of no less than the needed amount as the curing catalyst.

Specific examples of the silane coupling agent other than aminosilane include isocyanate silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, and (isocyanatemethyl)dimethoxymethylsilane; ketimine type silanes such as N-(1,3-dimethylbutylidene)-3-(triethoxysilyl)-1-propaneamine; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, and mercaptomethyltriethoxysilane; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenyl bis(2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, and γ-acryloyloxypropyltriethoxysilane; halogen-containing silanes such as γ-chloropropyltrimethoxysilane; isocyanurate silanes such as tris(3-trimethoxysilylpropyl)isocyanurate, and the like. Additionally, reaction products of the aforementioned aminosilane with epoxysilane, reaction products of the aminosilane with isocyanate silane, reaction products of the aminosilane with (meth)acryloyloxy group-containing silane, and the like may also be used. Condensates obtained by allowing the aforementioned silanes to be partially condensed can also be used. Moreover, derivatives yielded by modification of these, such as amino-modified silyl polymers, silylated amino polymers, unsaturated aminosilane complexes, phenylamino long-chain alkylsilane, aminosilylated silicone, silylated polyesters, and the like can also be used as the silane coupling agent.

The aforementioned silane coupling agents may be used alone, but two or more kinds thereof may be also used as a mixture.

The amount of the silane coupling agent used in the present invention used is preferably approximately 0.01 to 20 parts by weight, more preferably approximately 0.1 to 10 parts by weight, and particularly preferably approximately 1 to 7 parts by weight based on 100 parts by weight of the polymer (A), or based on 100 parts by weight of total amount of the polymer (A) and the polymer (B) when the curable composition includes the polymer (A) and the polymer (B). When the amount is below this range, the adhesiveness may not be satisfactorily achieved. When the amount is beyond this range, practical curing speed may not be provided, or the curing speed may be so high that the regulation can be difficult, to the contrary.

In addition to the silane coupling agent described above, the adhesion-imparting agent is not particularly limited, but for example, epoxy resins, phenol resins, sulfur, alkyl titanates, aromatic polyisocyanate, and the like can be used. The adhesion-imparting agent may be used alone, or two or more kinds may be used as a mixture.

In addition, silicate may be used in the curable composition of the present invention. This silicate acts as a crosslinking agent, and has a function of improving the recovery property, durability, and creep resistance of the cured product obtained from the curable composition of the present invention. Furthermore, it also has an effect of further improving the curability. Additionally, effects of improving the adhesiveness and water resistant adhesiveness, as well as adhesion durability under high temperature and high humid conditions are also exhibited. Tetraalkoxysilane or partially hydrolyzed condensate thereof can be used as silicate. When the silicate is used, the amount is preferably 0.1 to 20 parts by weight, and more preferably 0.5 to 10 parts by weight based on 100 parts by weight of the polymer (A), or based on 100 parts by weight of total amount of the polymer (A) and the polymer (B) when the curable composition includes the polymer (A) and the polymer (B).

Specific examples of the silicate include e.g., tetraalkoxysilane (tetraalkylsilicate) such as tetramethoxysilane, tetraethoxysilane, ethoxytrimethoxysilane, dimethoxydiethoxysilane, methoxytriethoxysilane, tetra-n-propoxysilane, tetra-1-propoxysilane, tetra-n-butoxysilane, tetra-1-butoxysilane and tetra-t-butoxysilane, and partially hydrolyzed condensate thereof.

The partially hydrolyzed condensate of tetraalkoxysilane is more preferable since the cured products obtained from the curable composition has more superior effects of improvement of the recovery property, durability, and creep resistance as compared with those of tetraalkoxysilane.

As the partially hydrolyzed condensate of the tetraalkoxysilane, for example, products obtained by adding water to tetraalkoxysilane, followed by allowing for partial hydrolysis and condensation with a common method may be included. In addition, commercially available partially hydrolyzed condensate of organosilicate compound can also be used. Examples of such condensates include e.g., Methylsilicate 51, Ethylsilicate 40 (both manufactured by COLCOAT CO., Ltd.), and the like.

A filler may be added to the curable composition of the present invention. The filler can be used for: securing workability by adjusting the viscosity, thixotropy and the like of the curable composition; regulating the strength of the cured product; improving various types of physical properties such as improvement of the adhesiveness, and addition of the chemical resistance; modifying the surface of the cured product such as coloring and designability; reduction of the cost per weight; and the like. Examples of the filler include reinforcing fillers such as fume silica, precipitated silica, crystalline silica, molten silica, dolomite, anhydrous silicic acid, hydrous silicic acid, and carbon black; fillers such as calcium carbonate, magnesium carbonate, diatomaceous earth, baked clay, clay, talc, titanium oxide, bentonite, organic bentonite, ferric oxide, aluminum fine powder, flint powder, zinc oxide, active zinc oxide, Shirasu Balloon, glass microballoon, organic microballoon of a phenol resin or a vinylidene chloride resin, resin powders such as PVC powder of a chloride resin and PMMA powder; fibrous fillers such as glass fiber and filament, and the like. When the filler is used, the amount is preferably 1 to 250 parts by weight, and more preferably 10 to 200 parts by weight based on 100 parts by weight of the polymer (A), or based on 100 parts by weight of total amount of the polymer (A) and the polymer (B) when the curable composition includes the polymer (A) and the polymer (B).

The filler can also be dehydrated and dried beforehand by mixing uniformly with a dehydrating agent such as calcium oxide, and thereafter enclosing in a bag constituted with an airtight material, followed by leaving to stand for an appropriate period of time as disclosed in JP-A-2001-181532. By using such a filler having a low water content, the storage stability can be improved when one-component composition is prepared, in particular.

In addition, when a composition having high transparency is to be obtained, as disclosed in JP-A-11-302527, a polymer powder of a raw material polymer such as methyl methacrylate, or amorphous silica can be used as the filler. In addition, as disclosed in JP-A-2000-38560, by using as a filler hydrophobic silica that is a silicon dioxide fine powder having a hydrophobic group bound on the surface thereof, a highly transparent composition can be obtained. Although the surface of the silicon dioxide fine powder generally presents a silanol group (—SiOH), hydrophobic silica is provided by allowing this silanol group to react with an organic silicon halide, an alcohol or the like to produce a —SiO— hydrophobic group. Specifically, the silanol group presented on the surface of the silicon dioxide fine powder is allowed to react with dimethylsiloxane, hexamethyldisilazane, dimethyldichlorsilane, trimethoxyoctylsilane, trimethylsilane or the like. The silicon dioxide fine powder having the surface formed with a silanol group (—SiOH) is referred to as hydrophilic silica fine powder.

Although calcium carbonate is classified broadly into heavy calcium carbonate obtained by pulverization and classification of a natural raw material, and chemically produced precipitated calcium carbonate (fine calcium carbonate), the precipitated calcium carbonate generally has smaller size of the primary particle. Among the fine calcium carbonate, those having a particle size of no greater than 0.1 μm is referred to as colloidal calcium carbonate. Many of the fine calcium carbonate is subjected to a surface treatment with an organic substance such as a fatty acid or a fatty acid ester. Examples of the surface treating agent include fatty acids such as caproic acid, caprylic acid, pelargonic acid, capric acid, undecanoic acid, lauric acid, myristic acid, palmitic acid, stearic acid, behenic acid and oleic acid, and esters and salts thereof; sulfuric acid ester type anionic surfactants such as polyoxyethylenealkyl ether sulfuric acid esters and long chain alcohol sulfuric acid esters and the like, and sodium salts and potassium salts thereof; as well as sulfonic acid type anionic surfactants such as alkylbenzenesulfonic acid, alkylnaphthalenesulfonic acid, paraffinsulfonic acid, a-olefinsulfonic acid, alkylsulfosuccinic acid and the like, and sodium salts and potassium salts thereof; and the like.

When production of a cured product with greater strength is desired by using such a filler, a filler selected predominantly from fume silica, precipitated silica, crystalline silica, molten silica, dolomite, anhydrous silicic acid, hydrous silicic acid, carbon black, surface-treated fine calcium carbonate, baked clay, clay, and active zinc oxide is preferably used in an amount of 1 to 200 parts by weight based on 100 parts by weight of the polymer (A), or based on 100 parts by weight of total amount of the polymer (A) and the polymer (B) when the curable composition includes the polymer (A) and the polymer (B), thereby capable of leading to preferable results. In addition, when production of a cured product with less strength and great elongation upon fracture is desired, a filler selected predominantly from titanium oxide, heavy calcium carbonate, magnesium carbonate, talc, ferric oxide, zinc oxide, and Shirasu balloon is preferably used in an amount of 5 to 200 parts by weight based on 100 parts by weight of the polymer (A), or based on 100 parts by weight of total amount of the polymer (A) and the polymer (B) when the curable composition includes the polymer (A) and the polymer (B), thereby capable of leading to preferable results. In general, as the larger specific surface area of calcium carbonate is provided, the greater effect of improvement of the strength at break, elongation at break and adhesiveness of the cured product can be exhibited. These fillers may be used alone, or two or more of them may be used as a mixture, as a matter of course. When calcium carbonate is employed, to use surface-treated fine calcium carbonate and calcium carbonate having a great particle size such as heavy calcium carbonate in combination is desired. The surface-treated fine calcium carbonate has a particle size of preferably no greater than 0.5 µm, and the surface treatment is preferably carried out with a fatty acid, a fatty acid ester, a fatty acid salt or the like. In addition, the calcium carbonate having a great particle size has a particle size of preferably no less than 1 µm, and those not subjected to the surface treatment can be used.

In order to improve the workability (anti-sagging and the like) of the curable composition, and to make the surface of the cured product matt, addition of an organic balloon or an inorganic balloon as a filler is preferred. These fillers can be also subjected to a surface treatment, and may be used alone, or two or more of them may be used as a mixture. In order to improve the workability (anti-sagging and the like), the balloon has a particle size of preferably no greater than 0.1 mm. In order to make the surface of the cured product matt, the particle size is preferably 5 to 300 µm.

The curable composition of the present invention has favorable chemical resistance and the like. Therefore the composition can be suitably used for joints of the housing outer walls, which include siding boards, particularly ceramic siding board, and the like, and for adhesives of outer wall tiles, which will be left on the joints as the adhesives are applied. And it is desired that the design of outer walls is in harmony with the design of the sealant. In particular, the composition is used for high-quality outer walls by sputtering painting, admixing with a coloring aggregate, or the like. When the curable composition of the present invention is blended with a scaly or granular substance having a diameter of no less than 0.1 mm, and preferably about 0.1 to 5.0 mm, the resulting cured product will be in harmony with such high-quality outer walls, and the external appearance of the cured product is maintained over a long term since the cured product is excellent in chemical resistance. In such a case, sand spread type or sand stone type outer walls with a rough texture surface can be formed when a granular substance is used, while when a scaly substance is used, irregular surface is formed resulting from the scales.

Preferable diameter, blend amount, material and the like of the scaly or granular substance is as follows, as described in JP-A-9-53063.

When the granular substance is used, its diameter may be no less than 0.1 mm, and preferably about 0.1 to 5.0 mm, which is suitably determined to have a size that meets the quality of the material, the pattern and the like of the outer wall. Those having a diameter of about 0.2 mm to 5.0 mm, or about 0.5 mm to 5.0 mm can be also used. When the scaly substance is used, the thickness may be approximately 1/10 to 1/5 of the diameter (about 0.01 to 1.00 mm). The scaly or granular substance may be beforehand mixed in the sealing base compound and carried to the operation site in the form of a sealing compound, or mixed in the sealing base compound at the operation site upon use.

The scaly or granular substance may be blended in an amount of about 1 to 200 parts by weight based on 100 parts by weight of the composition such as a sealing compound, an adhesive and the like. The blending amount may be determined appropriately depending on the size of each scaly or granular substance, and the quality of the material, pattern and the like of the outer wall.

As the scaly or granular substance, a natural product such as silica sand or mica, a synthetic rubber, a synthetic resin, an inorganic substance such as alumina may be used. In order to improve the designability when filled in the joint part, it is colored to have an adequate color in accordance with the material, the pattern and the like of the outer wall. Preferable finishing method and the like are disclosed in JP-A-9-53063.

Furthermore, when balloons (preferably, mean particle diameter being no less than 0.1 mm) are used for similar objects, a surface with sand spread type or sand stone type rough texture is provided, and weight saving can be implemented. Preferable diameter, blending amount, material and the like of the balloon are as follows, as disclosed in JP-A-10-251618.

The balloon is a spherical filler having a hollow space inside. Examples of the material of this balloon include inorganic materials such as glass, Shirasu and silica, and organic materials such as phenol resins, urea resins, polystyrene and saran, but not limited just thereto. The inorganic material and the organic material may also be conjugated, or laminated, thereby capable of forming multiple layers. An inorganic or organic balloon, or conjugated balloon of these may be used. Furthermore, as the balloon, single type of the balloon may be used, or multiple types of mixed balloons may be also used with different kinds of materials. Moreover, the balloon which may be used can have the surface subjected to processing or coating, alternatively, one having the surface treated with any of various types of surface treating agents can also be used. For example, the organic balloon may be coated with calcium carbonate, talc, titanium oxide or the like, or the inorganic balloon may be subjected to a surface treatment with a silane coupling agent, or the like.

In order to obtain the surface having a sand spread type or sand stone type rough texture, the balloon has a particle size of preferably no less than 0.1 mm. Those having a particle size of about 0.2 mm to 5.0 mm, or about 0.5 mm to 5.0 mm can also be used. Those having a particle size of less than 0.1 mm may not provide the rough texture but just increase the viscosity of the composition even though they are blended in a large amount. The blending amount of the balloon can be readily determined depending on the degree of the intended sand spread type or sand stone type rough texture. In general, it is desired to blend one having a particle size of no less than 0.1 mm at a proportion by volume concentration in the composition falling within the range of 5 to 25% by volume. The volume concentration of the balloon being less than 5% by volume may lead to failure in providing rough texture, while the volume concentration exceeding 25% by volume is likely to result in increase in the viscosity of the sealing material or the adhesive, accompanied by inferior workability, elevated modulus of the cured product, and thus basic performances of the sealing material or the adhesive tend to be deteriorated. The volume concentration which can result in particularly preferable balance with the basic performances of the sealing material is 8 to 22% by volume.

When the balloon is used, such an antislipping agent as disclosed in JP-A-2000-154368, such an amine compound for making the surface of the cured product not only irregular but also matt as disclosed in JP-A-2001-164237, particularly primary and/or secondary amines having a melting point of no lower than 35° C. may be included.

Specific examples of the balloon include those disclosed in each publication of JP-A-2-129262, JP-A-4-8788, JP-A-4-173867, JP-A-5-1225, JP-A-7-113073, JP-A-9-53063, JP-A-10-251618, JP-A-2000-154368, JP-A-2001-164237, WO97/05201 and the like.

Additionally, a thermally expandable particulate hollow body disclosed in JP-A-2004-51701, JP-A-2004-66749 or the like can be used as the balloon. The thermally expandable particulate hollow body refers to a plastic spherical body in which a compound having a low boiling point such as hydrocarbon having 1 to 5 carbon atoms is packed in a polymer outer shell material (vinylidene chloride based copolymer, acrylonitrile based copolymer, or vinylidene chloride-acrylonitrile copolymer) to give a sphere. By heating the adhesion portion formed using the present curable composition, the gas pressure in the shell of the thermally expandable particulate hollow body is increased, thereby dramatically expanding the volume through softening of the polymer outer shell material, which plays a role in detaching the adhesive interface. Addition of the thermally expandable particulate hollow body enables simple detachment by merely heating when it is unnecessary without being accompanied by disruption of the material, and thus a heat detachable adhesive composition can be obtained without using any organic solvent at all.

Also in the case in which the curable composition of the present invention includes particles of a sealing material cured product, the surface of the resulting cured product will have irregularity formed thereon, and the designability can be improved. Preferable diameter, blending amount, material and the like of the particles of the sealing material cured product are as follows, as disclosed in JP-A-2001-115142. The diameter is preferably 0.1 mm to 1 mm, and more preferably approximately 0.2 to 0.5 mm. The blending amount in the curable composition is preferably 5 to 100% by weight, and more preferably 20 to 50% by weight. The material may be an urethane resin, silicone, modified silicone, a polysulfide rubber or the like, and not limited as long as it is a material which can be used as a sealing material, but a sealing material of modified silicone base is preferred.

Furthermore, a plasticizer can be added to the curable composition of the present invention. By adding a plasticizer, the viscosity and the slump property of the curable composition, as well as mechanical properties such as tensile strength, elongation and the like of the cured product obtained by hardening the curable composition can be adjusted. Examples of the plasticizer include phthalic acid esters such as dibutyl phthalate, diheptyl phthalate, bis(2-ethylhexyl) phthalate, and butylbenzyl phthalate; non-aromatic dibasic acid esters such as dioctyl adipate, dioctyl sebacate, dibutyl sebacate, and isodecyl succinate; aliphatic esters such as butyl oleate, and methyl acetyl lysylinolate; phosphoric acid esters such as tricresyl phosphate, and tributyl phosphate; trimellitic acid esters; chlorinated paraffins; hydrocarbon based oils such as alkyldiphenyl, and partially hydrogenated terphenyl; process oils; epoxy plasticizers such as epoxydized soybean oil, and benzyl epoxystearate.

In addition, as the plasticizer, a polymeric plasticizer can also be used. When a polymeric plasticizer is used, in comparison with the case in which a low molecular plasticizer (monomeric plasticizer) that is a plasticizer not including a polymer component in the molecule is used, initial physical properties can be maintained for a longer term. Moreover, drying properties (also referred to as paintability) can be improved when an alkyd paint is applied to a cured product. Specific examples of the polymeric plasticizer include: vinyl based polymers obtained by polymerization of a vinyl based monomer by a variety of methods; esters of polyalkylene glycol such as diethylene glycol dibenzoate, triethylene glycol dibenzoate, and pentaerythritol ester; polyester based plasticizers obtained from dibasic acid such as sebacic acid, adipic acid, azelaic acid or phthalic acid, and dihydric alcohol such as ethylene glycol, diethylene glycol, triethylene glycol, propylene glycol, and dipropylene glycol; polyether polyol such as polyethylene glycol, polypropylene glycol and polytetramethylene glycol having a molecular weight of no less than 500 and more preferably no less than 1,000, or polyethers such as derivatives prepared by converting the hydroxyl group of these polyether polyols into an ester group, an ether group or the like; polystyrenes such as polystyrene and poly-a-methylstyrene; polybutadiene, polybutene, polyisobutylene, butadiene-acrylonitrile, polychloroprene, and the like, but not limited thereto.

Among these polymeric plasticizers, those miscible with the polymer (A), or with the polymer (A) and polymer (B) when the curable composition includes the polymer (A) and the polymer (B) are preferred. In this respect, polyethers and vinyl based polymers are preferred. Furthermore, to use a polyether as the plasticizer is preferred since surface curability and curability in deep section are improved, and the composition does not undergo curing delay after storage. In particular, polypropylene glycol is more preferred of these. Additionally, in light of the miscibility and weather resistance as well as heat resistance, vinyl based polymers are preferred. Among the vinyl based polymers, acrylic polymers and/or methacryl based polymers are preferred, and acrylic polymers such as polyacrylic acid alkyl esters are more preferred. The synthesis method of this polymer is preferably a living radical polymerization which enables narrowing of the molecular weight distribution and lowering of viscosity, and an atom transfer radical polymerization is more preferred. Also, to use a polymer by a SGO process, generally referred to, which was obtained by continuous bulk polymerization of an alkyl acrylate monomer at a high temperature and a high pressure as disclosed in JP-A-2001-207157 is preferred.

The polymeric plasticizer has a number average molecular weight of preferably 500 to 15,000, more preferably 800 to 10,000, still more preferably 1,000 to 8,000, and particularly preferably 1,000 to 5,000. The number average molecular weight is most preferably 1,000 to 3,000. When the molecular weight is too low, the plasticizer outflows in a time dependent manner due to heat, rainfall and the like, initial physical properties cannot be maintained for a long term. This event will be the cause of pollution resulting from dust adhesion and the like, and also the alkyd painting performance cannot be improved. In addition, too high molecular weight may result in too high viscosity, leading to inferior workability. The molecular weight distribution of the polymeric plasticizer is not particularly limited, but it is preferably as narrow as possible, which may be less than 1.80. The molecular weight distribution is more preferably no greater than 1.70, still more preferably no greater than 1.60, even more preferably no greater than 1.50, particularly preferably no greater than 1.40, and most preferably no greater than 1.30.

In the case of the polyether based polymer, the number average molecular weight thereof is determined by a terminal group analysis method, while in the case of other polymers, it is determined by a GPC method. Moreover, the molecular weight distribution (Mw/Mn) is determined also by a GPC method (in terms of the polystyrene equivalent).

Further, the polymeric plasticizer may not have a reactive silicon group, but those having a reactive silicon group are acceptable. When the reactive silicon group is included, it acts as a reactive plasticizer, transfer of the plasticizer from the cured product can be prevented. When the reactive silicon group is included, its number is preferably no greater than 1, and more preferably no greater than 0.8 on average per molecule. When the plasticizer having a reactive silicon group, particularly an oxyalkylene polymer having a reactive silicon group is used, the number average molecular weight is preferably lower than the polymer (A), or than the polymer (A) and the polymer (B) when the curable composition includes the polymer (A) and the polymer (B). Otherwise, the plasticizing effect may not be achieved.

The plasticizer may be used alone, or two or more thereof may be used in combination. Alternatively, the low molecular plasticizer and the polymeric plasticizer may be used in combination. Also, these plasticizers can be blended in production of the polymer.

The amount of the plasticizer used is preferably 5 to 150 parts by weight, more preferably 10 to 120 parts by weight, and still more preferably 20 to 100 parts by weight based on 100 parts by weight of the polymer (A), or based on 100 parts by weight of total amount of the polymer (A) and the polymer (B) when the curable composition includes the polymer (A) and the polymer (B). When the amount is less than 5 parts by weight, the effect as a plasticizer may not be exhibited, while the amount exceeding 150 parts by weight may lead to deficiency of the mechanical strength of the cured product.

A tackifier may be added to the curable composition of the present invention. Although the tackifying resin is not particularly limited, commonly used one can be used irrespective of the state at ordinary temperatures, which may be either a solid or liquid. Specific examples include styrene based block copolymers, hydrogenated products thereof, phenol resins, modified phenol resins (for example, cashew oil-modified phenol resins, tall oil-modified phenol resins and the like), terpenephenol resins, xylene-phenol resins, cyclopentadiene-phenol resins, coumarone-indene resins, rhodine based resins, rhodine ester resins, hydrogenated rhodine ester resins, xylene resins, low molecular weight polystyrene based resins, styrene copolymer resins, petroleum resins (for example, C5 hydrocarbon resins, C9 hydrocarbon resins, C5 C9 hydrocarbon copolymerized resins and the like), hydrogenated petroleum resins, terpene based resins, DCPD resins, petroleum resins, and the like. These may be used alone, or two or more thereof may be used in combination. As the styrene based block copolymers and hydrogenated products thereof, styrene-butadiene-styrene block copolymers (SBS), styrene-isoprene-styrene block copolymers (SIS), styrene-ethylene butylene-styrene block copolymers (SEBS), styrene-ethylene propylene-styrene block copolymers (SEPS), styrene-isobutylene-styrene block copolymers (SIBS), and the like. The tackifying resin may be used alone, or two or more thereof may be used in combination.

The tackifying resin may be used in an amount of preferably 5 to 1,000 parts by weight, and more preferably 10 to 100 parts by weight based on 100 parts by weight of the polymer (A), or based on 100 parts by weight of total amount of the polymer (A) and the polymer (B) when the curable composition includes the polymer (A) and the polymer (B).

A solvent or diluent may be added to the curable composition of the present invention. The solvent and the diluent are not particularly limited, and aliphatic hydrocarbons, aromatic hydrocarbons, alicyclic hydrocarbons, halogenated hydrocarbons, alcohols, esters, ketones, ethers and the like can be used. When the solvent or diluent is used, the solvent has a boiling point of preferably no lower than 150° C., more preferably no lower than 200° C., and particularly preferably no lower than 250° C. in view of the problems of air pollution which may be caused when the composition is used indoors. The solvent or diluent may be used alone, or two or more thereof may be used in combination.

A physical property adjustor which adjusts the tensile characteristics of the resulting cured product may be added to the curable composition of the present invention as needed. Although the physical property adjustor is not particularly limited, for example, alkylalkoxysilanes such as methyltrimethoxysilane, dimethyldimethoxysilane, trimethylmethoxysilane, and n-propyltrimethoxysilane; alkylisopropenoxysilane such as dimethyl diisopropenoxysilane and methyltriisopropenoxysilane, alkoxysilanes having an unsaturated group such as vinyltrimethoxysilane and vinyldimethylmethoxysilane; silicone varnishes; polysiloxanes, and the like may be exemplified. By using the physical property adjustor, the hardness can be increased or decreased to the contrary in hardening of the curable composition of the present invention, or the elongation upon fracture can be elicited. The aforementioned physical property adjustor may be used alone, or two or more thereof may be used in combination.

Particularly, compounds that produce a compound having a monovalent silanol group in the molecule by hydrolysis have an effect of lowering the modulus of the cured product without deteriorating the tack of the surface of the cured product. Particularly, compounds that produce trimethyl silanol are preferred. As the compound that produces a compound having a compound having a monovalent silanol group in the molecule by hydrolysis, compounds disclosed in JP-A-5-117521 may be exemplified. In addition, compounds, which are derivatives of alkyl alcohol such as hexanol, octanol or decanol, that produce a silicon compound that produces $R_3SiOH$ such as trimethyl silanol by hydrolysis; and compounds, which are derivatives of polyhydric alcohol having no less than 3 hydroxyl groups such as trimethylolpropane, glycerin, pentaerythritol or sorbitol, that produce a silicon compound that produces $R_3SiOH$ such as trimethyl silanol by hydrolysis disclosed in JP-A-11-241029 may be exemplified.

Moreover, compounds, which are derivatives of oxypropylene polymer, that produce a silicon compound that produces $R_3SiOH$ such as trimethyl silanol by hydrolysis as disclosed in JP-A-7-258534 may be also exemplified. Additionally, polymers having a silicon-containing group which can be a monosilanol-containing compound by hydrolysis and a crosslinkable hydrolyzable silicon-containing group disclosed in JP-A-6-279693 can be also used.

The physical property adjustor may be used in an amount of preferably 0.1 to 20 parts by weight, and more preferably 0.5 to 10 parts by weight based on 100 parts by weight of the polymer (A), or based on 100 parts by weight of total amount of the polymer (A) and the polymer (B) when the curable composition includes the polymer (A) and the polymer (B).

A thixotropic agent (anti-sagging agent) may be added to the curable composition of the present invention as needed in order to prevent sagging and to improve the workability. Although the anti-sagging agent is not particularly limited, for example, polyamide waxes; hydrogenated castor oil derivatives; metal soaps such as calcium stearate, aluminum stearate and barium stearate, and the like may be included. When rubber powders having a particle size of 10 to 500 μm as disclosed in JP-A-11-349916, or organic fibers as disclosed in JP-A-2003-155389 are used, compositions having high thixotropy and being favorable in workability may be obtained. These thixotropic agents (anti-sagging agents) may be used alone, or two or more thereof may be used in combination. The thixotropic agent can be used in an amount of preferably 0.1 to 20 parts by weight based on 100 parts by weight of the polymer (A), or based on 100 parts by weight of total amount of the polymer (A) and the polymer (B) when the curable composition includes the polymer (A) and the polymer (B).

Moreover, a compound including an epoxy group in one molecule may be added to the curable composition of the present invention. When the compound including an epoxy group is used, the recovery property of the cured product can be improved. As the compound including an epoxy group, epoxydized unsaturated fats and oils, epoxydized unsaturated fatty acid esters, alicyclic epoxy compounds, compounds typified by epichlorohydrin derivatives and mixtures thereof, and the like can be illustrated. Specific examples include epoxydized soybean oils, epoxydized linseed oils, bis(2-ethylhexyl)-4,5-epoxycyclohexane-1,2-dicarboxylate (E-PS), epoxyoctyl stearate, epoxybutyl stearate, and the like. Among these, E-PS is particularly preferred. The epoxy compound may be used in an amount in the range of 0.5 to 50 parts by weight based on 100 parts by weight of the polymer (A), or based on 100 parts by weight of total amount of the polymer (A) and the polymer (B) when the curable composition includes the polymer (A) and the polymer (B).

A photocurable substance may be added to the curable composition of the present invention. When the photocurable substance is used, a coating film of the photocurable substance is formed on the surface of the cured product, whereby tack and weather resistance of the cured product can be improved. In the photocurable substance, a chemical change of the molecular structure is caused by an action of light within a fairly short period of time, thereby causing change in alteration of physical properties such as hardening. As such types of compounds, many are known such as organic monomers, oligomers, resins, compositions including the same, and the like, and commercially available product may be employed. Typical compounds which can be used include unsaturated acrylic compounds, vinyl polycinnamates or azidized resins and the like. As the unsaturated acrylic compound, monomers, oligomers or mixtures thereof having one to several acrylic or methacryl unsaturated groups, and monomers such as propylene (or butylene, ethylene) glycol di(meth)acrylate and neopentyl glycol di(meth)acrylate, and oligo esters having a molecular weight of no greater than 10,000 are exemplified. Specifically, illustrative examples include e.g., bifunctional special acrylates, ARONIX M-210, ARONIX M-215, ARONIX M-220, ARONIX M-233, ARONIX M-240 and ARONIX M-245; trifunctional special acrylates, ARONIX M-305, ARONIX M-309, ARONIX M-310, ARONIX M-315, ARONIX M-320 and ARONIX M-325; and polyfunctional special acrylates, ARONIX M-400 (ARONIX in the foregoing are all products manufactured by Toagosei Chemical Industry Co., Ltd.). Particularly, compounds having an acryl functional group are preferred, and compounds including the same three or more functional group on average per molecule are preferred.

Illustrative examples of the vinyl polycinnamates include photosensitive resins having a cinnamoyl group as a photosensitive group, which as esterified products of polyvinyl alcohol with cinnamic acid, as well as many vinyl polycinnamate derivatives. Azidized resins are known as photosensitive resins including an azido group as a photosensitive group, and in general, rubber photosensitive liquids including a photosensitizer added as a diazido compound, and those described in detail in "Photosensitive Resin" (published on Mar. 17, 1972, issued by Insatsu Gakkai Shuppanbu Ltd., page 93-, page 106-, page 117-) may be exemplified, which may be used alone or as a mixture, or with a sensitizer added as needed. When a sensitizer such as ketones and nitro compounds, and an accelerating agent such as amines are added, the effect may be improved. The amount of the photocurable substance used is preferably 0.1 to 20 parts by weight, and more preferably 0.5 to 10 parts by weight based on 100 parts by weight of the polymer (A), or based on 100 parts by weight of total amount of the polymer (A) and the polymer (B) when the curable composition includes the polymer (A) and the polymer (B). When the amount of the photocurable substance used is less than 0.1 parts by weight, the effect of improving the weather resistance may be improved, while when the amount is greater than 20 parts by weight, the cured product may be too hard, and cracks are likely to be generated.

An oxygen curable substance may be added to the curable composition of the present invention. Illustrative oxygen curable substance may be an unsaturated compound which can react with oxygen in the air, and when it reacts with oxygen in the air, a cured coating film is formed in the vicinity of the surface of the cured product, thereby capable of serving in preventing the tack of the surface, or the adhesion of dirt and dust to the surface of the cured product. Specific examples of the oxygen curable substance include drying oils typified by tung oil and linseed oil, and various types of alkyd resin obtained by modification of the compound; acrylic polymers modified by a drying oil, epoxy based resins, silicon resins; liquid polymers such as 1,2-polybutadiene, 1,4-polybutadiene and polymers of C5 to C8 diene obtained by polymerization or copolymerization of diene based compounds such as butadiene, chloroprene, isoprene and 1,3-pentadiene, and liquid copolymers such as NBR and SBR obtained by copolymerization of such a diene based compound with a monomer such as acrylonitrile or styrene that is copolymerizable with these diene based compounds at a ratio to provide the diene based compound as a principal component, as well as various types of modification products of the same (maleinated modification product, boiled oil modification product, etc.), and the like. These may be used alone, or two or more thereof may be used in combination. Of these, tung oil and liquid diene based polymers are particularly preferred. Furthermore, when a catalyst that accelerates an oxidative curing reaction or a metal dryer is used in combination, the effect may be improved. Illustrative examples of the catalyst and metal dryer include metal salts such as cobalt naphthenate, lead naphthenate, zirconium naphthenate, cobalt octylate and zirconium octylate, amine compounds, and the like. The amount of the oxygen curable substance used falls within the range of preferably 0.1 to 20 parts by weight, and more preferably 0.5 to 10 parts by weight based on 100 parts by weight of the polymer (A), or based on 100 parts by weight of total amount of the polymer (A) and the polymer (B) when the curable composition includes the polymer (A) and the polymer (B). When the amount is less than 0.1 parts by weight, improvement of pollution resistance may be insufficient, while the amount exceeding 20 parts by weight may result in tendency to deteriorate the tensile characteristics and the like of the cured product. As disclosed in JP-A-3-160053, the oxygen curable substance is desirably used in combination with the photocurable substance.

An antioxidant (antiaging agent) may be added to the curable composition of the present invention. When the antioxidant is used, heat resistance of the cured product can be enhanced. As the antioxidant, hindered phenolic, monophenolic, bisphenolic, polyphenolic compounds can be demonstrated, and particularly hindered phenolic compounds are preferred. Similarly, hindered amine based light stabilizers presented as TINUVIN 622LD, TINUVIN 144, CHIMASSORB944LD and CHIMASSORB119FL (all in the foregoing manufactured by Ciba Specialty Chemicals Inc.); MARK LA-57, MARK LA-62, MARK LA-67, MARK LA-63 and MARK LA-68 (all in the foregoing manufactured by Asahi Denka Co., Ltd.); and SANOL LS-770, SANOL LS-765, SANOL LS-292, SANOL LS-2626, SANOL LS-1114 and SANOL LS-744 (all in the foregoing manufactured by Sankyo Co., Ltd. strain formula) can be also used. Specific examples of the antioxidant include those disclosed in JP-A-4-283259 and JP-A-9-194731. The amount of the antioxidant used falls within the range of preferably 0.1 to 10 parts by weight, and more preferably 0.2 to 5 parts by weight based on 100 parts by weight of the polymer (A), or based on 100 parts by weight of total amount of the polymer (A) and the polymer (B) when the curable composition includes the polymer (A) and the polymer (B).

A light stabilizer may be added to the curable composition of the present invention. When the light stabilizer is used, photo-oxidative deterioration of the cured product can be prevented. Illustrative examples of the light stabilizer include benzotriazole based, hindered amine based, benzoate based compounds and the like, and the hindered amine based compound s are particularly preferred. The amount of the light stabilizer used falls within the range of preferably 0.1 to 10 parts by weight, and more preferably 0.2 to 5 parts by weight based on 100 parts by weight of the polymer (A), or based on 100 parts by weight of total amount of the polymer (A) and the polymer (B) when the curable composition includes the polymer (A) and the polymer (B). Specific examples of the light stabilizer are disclosed also in JP-A-9-194731.

When the photocurable substance, particularly an unsaturated acrylic compound, is used in combination in the curable composition of the present invention, to use a tertiary amine-containing hindered amine based light stabilizer as the hindered amine based light stabilizer is preferred for improving the storage stability of the composition, as disclosed in JP-A-5-70531. As the tertiary amine-containing hindered amine based light stabilizer, light stabilizers such as TINUVIN 622LD and TINUVIN 144, CHIMASSORB119FL (all in the foregoing manufactured by Ciba Specialty Chemicals Inc.); MARK LA-57, LA-62, LA-67 and LA-63 (all in the foregoing manufactured by Asahi Denka Co., Ltd.); and SANOL LS-765, LS-292, LS-2626, LS-1114 and LS-744 (all in the foregoing Sankyo Co., Ltd.) may be exemplified.

An ultraviolet absorber may be added to the curable composition of the present invention. When the ultraviolet absorber is used, the surface weather resistance of the cured product can be improved. As the ultraviolet absorber, benzophenone based, benzotriazole based, salicylate based, substituted tolyl based and metal chelate based compounds and the like may be exemplified, and benzotriazole based compounds are particularly preferred. The amount of the ultraviolet absorber used falls within the range of preferably 0.1 to 10 parts by weight, and more preferably 0.2 to 5 parts by weight based on 100 parts by weight of the polymer (A), or based on 100 parts by weight of total amount of the polymer (A) and the polymer (B) when the curable composition includes the polymer (A) and the polymer (B). It is preferred that the phenolic or hindered phenolic antioxidant and the hindered amine based light stabilizer, and the benzotriazole based ultraviolet absorber be used in combination.

An epoxy resin can be added to the curable composition of the present invention. The curable composition to which the epoxy resin was added is particularly preferred as an adhesive, and in particular, as an adhesive for tiles of outer walls. Illustrative examples of the epoxy resin include epichlorohydrin-bisphenol A type epoxy resins, epichlorohydrin-bisphenol F type epoxy resins, flame retardant epoxy resins such as glycidyl ether of tetrabromobisphenol A, novolak type epoxy resins, hydrogenated bisphenol A type epoxy resins, glycidyl ether type epoxy resins of bisphenol A propylene oxide adducts, p-oxybenzoic acid glycidyl ether ester type epoxy resins, m-aminophenolic epoxy resins, diaminodiphenylmethane based epoxy resins, urethane-modified epoxy resins, various types of alicyclicepoxy resins, glycidyl ethers of polyhydric alcohol such as N,N-diglycidylaniline, N,N-diglycidyl-o-toluidine, triglycidylisocyanurate, polyalkylene glycol diglycidyl ether and glycerin, hydantoin type epoxy resins, epoxydized products of unsaturated polymers such as petroleum resins, and the like, but not limited thereto, and generally used epoxy resins may be used. Those including at least two epoxy groups in a molecule are preferred in light of high reactivity in curing, and ease in formation of three-dimensional network of the cured product. Examples of further preferable resin include bisphenol A type epoxy resins, novolak type epoxy resins, and the like. With respect to the weight ratio of these epoxy resins to the polymer (A), or to total amount of the polymer (A) and the polymer (B) when the curable composition includes the polymer (A) and the polymer (B), ((A) or (A)+(B))/epoxy resin is preferably 100/1 to 1/100. When the ratio ((A) or (A)+(B))/epoxy resin is less than 1/100, the effect of improving the impact strength or the toughness of the cured product of the epoxy resin may be hardly achieved. When the ratio ((A) or (A)+(B))/epoxy resin exceeds 100/1, the strength of the organic based polymer-cured product is likely to be insufficient. Although preferable ratio cannot be categorically determined since it may vary depending on the application and the like of the curable composition, for example, when improvement of the impact resistance, flexibility, toughness, peel strength and the like of the cured product of the epoxy resin is intended, based on 100 parts by weight of the epoxy resin, preferably 1 to 100 parts by weight, and more preferably 5 to 100 parts of the polymer (A), or of total amount of the polymer (A) and the polymer (B) when the curable composition includes the polymer (A) and the polymer (B) may be used. On the other hand, when improvement of the strength of the cured product of the polymer (A) component is intended, the epoxy resin may be used in an amount of preferably 1 to 200 parts by weight, and more preferably 5 to 100 parts by weight based on 100 parts by weight of the polymer (A), or based on 100 parts by weight of total amount of the polymer (A) and the polymer (B) when the curable composition includes the polymer (A) and the polymer (B).

When the epoxy resin is added, curing agent that allows the epoxy resin to be hardened can be used in combination in the curable composition of the present invention, as a matter of course. The epoxy resin curing agent which can be used is not particularly limited, and generally employed epoxy resin curing agent can be used. Specifically, illustrative examples include compounds e.g., primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenyl sulfone, isophoronediamine and amine terminated polyether; tertiary amines such as 2,4,6-tris(dimethylamino methyl)phenol and tripropylamine, and these salts of these tertiary amines; polyamide resins; imidazoles; dicyanogendiamides; boron trifluoride complex compounds; carboxylic anhydrides such as phthalic anhydride, hexahydrophthalic anhydride, tetrahydrophthalic anhydride, dodecynyl succinic anhydride, pyromellitic anhydride and chlorendic anhydride; alcohols; phenols; carboxylic acids; diketone complex compounds of aluminum or zirconium, and the like, but not limited thereto. Also, the curing agent may be used alone, or two or more thereof may be used in combination.

When the curing agent of the epoxy resin is used, the amount used is preferably 0.1 to 300 parts by weight based on 100 parts by weight of the epoxy resin.

As the curing agent of the epoxy resin, ketimine can be used. Ketimine is stably present under conditions not including moisture, but is decomposed into primary amine and ketone upon coming into contact with the moisture, and thus generated primary amine serves as a curing agent that is curable at room temperatures of the epoxy resin. When ketimine is used, a one pack type composition can be obtained. Such ketimine can be obtained by a condensation reaction of an amine compound and a carbonyl compound.

For synthesis of ketimine, known amine compounds and carbonyl compounds may be used, and for example, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine and p,p'-biphenylenediamine as the amine compound; polyvalent amines such as 1,2,3-triaminopropane, triaminobenzene, tris(2-aminoethyl)amine and tetrakis(aminomethyl)methane; polyalkylene based polyamines such as diethylenetriamine, triethylenetriamine and tetraethylenepentamine; polyoxyalkylene based polyamines; aminosilanes such as γ-aminopropyltriethoxysilane, N-(β-aminoethyl)-γ-aminopropyltrimethoxysilane and N-(β-aminoethyl)-γ-aminopropylmethyldimethoxysilane; and the like can be used. Also, as the carbonyl compound, aldehydes such as acetaldehyde, propionaldehyde, n-butylaldehyde, isobutyl aldehyde, diethyl acetaldehyde, glyoxal and benzaldehyde; cyclic ketones such as cyclopentanone, trimethylcyclopentanone, cyclohexanone and trimethylcyclohexanone; aliphatic ketones such as acetone, methylethyl ketone, methylpropyl ketone, methylisopropyl ketone, methylisobutyl ketone, diethyl ketone, dipropyl ketone, diisopropyl ketone, dibutyl ketone and diisobutyl ketone; β-dicarbonyl compounds such as acetyl acetone, methyl acetoacetate, ethyl acetoacetate, dimethyl malonate, diethyl malonate, methylethyl malonate, dibenzoylmethane; and the like can be used.

When an imino group is present in the ketimine, the imino group may be allowed to react with: styrene oxide; a glycidyl ether such as butylglycidyl ether or allylglycidyl ether; a glycidyl ester or the like. These ketimines may be used alone, or two or thereof may be used in combination. The ketimine can be used in an amount of 1 to 100 parts by weight based on 100 parts by weight of the epoxy resin, and its amount can be determined in accordance with the types of the epoxy resin and ketimine.

To the curable composition of the present invention may be added a phosphorus based plasticizer such as ammonium polyphosphate or tricresyl phosphate, a fire retardant such as aluminum hydroxide, magnesium hydroxide, or thermally expandable graphite. The aforementioned fire retardant may be used alone, or two or more thereof may be used in combination.

The fire retardant may be used in an amount of preferably 5 to 200 parts by weight, and more preferably 10 to 100 parts by weight based on 100 parts by weight of the polymer (A), or based on 100 parts by weight of total amount of the polymer (A) and the polymer (B) when the curable composition includes the polymer (A) and the polymer (B).

For the purpose of adjusting various physical properties of the curable composition or the resultant cured product, various types of additives other than those described above may be added as needed to the curable composition of the present invention. Examples of such additives include e.g., curability adjusting agents, radical inhibitors, metal inactivators, ozone antidegradants, phosphorus based peroxide decomposers, lubricants, pigments, foaming agents, repellents for ants, mildew proofing agents, and the like. These various types of additives may be used alone, or two or more thereof may be used in combination. Specific examples of the additives other than those herein referred to are disclosed in each publication such as e.g., JP-B-4-69659, JP-B-7-108928, JP-A-63-254149, JP-A-64-22904, and JP-A-2001-72854.

The curable composition of the present invention can be prepared as a one component system by compounding all the components to be blended followed by air-tightly sealing to store beforehand, which is cured by moisture in the air after the coating. Alternatively, it can be prepared as a two-component system by separately compounding components such as the curing catalyst, filler, plasticizer, water and the like as a curing agent, and mixing the blended materials with a polymer composition in use. In light of the workability, the one component system is preferred.

When the curable composition is prepared as a one component system, all components to be blended are compounded beforehand, therefore, the components to be blended which contain moisture are preferably used after they are dehydrated and dried beforehand, or dehydrated by reduced pressure or the like during the compounding/kneading. When the curable composition is prepared as a two-component system, it is not necessary to blend a curing catalyst to the base component that contains the polymer having a reactive silicon group. Therefore, less concern about gelation is necessary even though moisture is included to a slight extent in the blend, but it would be preferred to subject to dehydration and drying when storage stability for a long term is required. Suitable dehydrating and drying method may be a heat drying in the case of solids such as powders, while a vacuum dehydration or a dehydration using synthetic zeolite, active alumina, silica gel, quick lime, magnesium oxide or the like is suitable in the case of liquids. Alternatively, dehydration may be also permitted by blending a small amount of an isocyanate compound thereby allowing the isocyanate group to react with water. Also, dehydration may be carried out by blending an oxazolidine compound such as 3-ethyl-2-methyl-2-(3-methylbutyl)-1,3-oxazolidine to permit reaction with water. In addition to such a dehydration and drying method, storage stability can be further improved by adding lower alcohol such as methanol or ethanol; or an alkoxysilane compound such as n-propyltrimethoxysilane, vinyltrimethoxysilane, vinylmethyldimethoxysilane, methylsilicate, ethylsilicate, γ-mercaptopropylmethyldimethoxysilane, γ-mercaptopropylmethyldiethoxysilane or γ-glycidoxypropyltrimethoxysilane.

The amount of the silicon compound used which can react with water such as a dehydrating agent, particularly vinyltrimethoxysilane is preferably 0.1 to 20 parts by weight, and more preferably 0.5 to 10 parts by weight based on 100 parts by weight of the polymer (A), or based on 100 parts by weight of total amount of the polymer (A) and the polymer (B) when the curable composition includes the polymer (A) and the polymer (B).

The preparation method of the curable composition of the present invention is not particularly limited, and common methods such as for example, those including: compounding the aforementioned components; and kneading by means of a mixer, a roll or a kneader at an ordinary temperature or under heating, or dissolving the components using a small quantity of a suitable solvent to execute mixing may be employed.

The curable composition of the present invention forms a three-dimensional network organization by the action of moisture upon exposure to the ambient air, thereby being hardened into a solid having rubbery elasticity.

The curable composition of the present invention can be used for: binders; sealants for use in buildings, marine vessels, automobiles and roadways; adhesives, profiling agents, vibration isolators, damping materials, soundproof materials, foaming materials, paints, spraying materials, and the like. Since the cured product obtained by hardening the curable composition of the present invention is superior in the flexibility and adhesiveness, it is more preferred to be used as a sealant or an adhesive among the applications as described above.

In addition, the curable composition of the present invention can be used in a variety of applications such as: electrical and electronic parts materials such as sealants for solar cell back faces; electrical insulating materials such as insulating coating materials for electric wires and cables; elastic adhesives; contact type adhesives; spray type sealing material; crack repairing materials; adhesives for tiling; powdery paints; casting materials; medical rubber materials; medical agglutinants; medical equipment sealing materials; food packaging material; sealants for joints of sheathing materials such as siding boards; coating materials; primer; conductive materials for electromagnetic wave shielding; thermally conductive materials; hot melt materials; potting agents for electrical and electronic applications; films; gaskets; various types of molding materials; as well as sealants for rust prevention and waterproofing of wired sheet glass and shatter-proof glass end faces (cut sections); and liquid sealing agents used for automobile parts, electric parts and various types of mechanical parts; and the like. Moreover, since the curable composition of the present invention can cohesively adhere to a wide variety of substrates such as glasses, porcelains, woods, metals, resin molded products and the like, it can be also used as a variety of type of cohesive compositions and adhesive compositions alone, or with the aid of a primer. Furthermore, the curable composition of the present invention can be also used as adhesives for interior panels, adhesives for exterior panels, adhesives for tiling, adhesives for installing stone veneers, adhesives for finishing of ceilings, adhesive for finishing of floors, adhesives for finishing walls, adhesives for vehicle panels, adhesives for assembly of electrical and electronic precision equipments, sealants for direct grazing, sealants for multi-layer glasses, sealants for SSG construction methods, or sealants for working joints of architectures.

EXAMPLES

Next, the present invention is explained in detail by way of Examples and Comparative Examples, but the present invention is not limited thereto.

Synthesis Example 1

Using polyoxypropylenediol having a molecular weight of about 2,000 as an initiator, polymerization of propylene oxide was carried out with a zinc hexacyano cobaltate glyme complex catalyst to obtain polypropylene oxide having a terminal hydroxyl group and having a number average molecular weight of about 14,500 (in terms of the polystyrene equivalent molecular weight determined using: HLC-8120GPC manufactured by Tosoh Corporation as the liquid feeding system; TSK-GEL H type manufactured by Tosoh Corporation as the column; and THF as the solvent). Subsequently, a methanol solution of 1.2 times equivalent of NaOMe based on the hydroxyl group of this hydroxyl group-terminated polypropylene oxide was added thereto, and methanol was distilled off. Further, allyl chloride was added thereto to convert the terminal hydroxyl group into an allyl group. The unreacted allyl chloride was removed by devolatilization under reduced pressure. After 300 parts by weight of n-hexane and 300 parts by weight of water were added to 100 parts by weight of thus resulting unpurified allyl group-terminated polypropylene oxide while stirring, water was removed by centrifugal separation, and 300 parts by weight of water was added to the resulting hexane solution while stirring. After water was removed again by centrifugal separation, hexane was removed by devolatilization under reduced pressure. Thus, an allyl-terminated bifunctional polypropylene oxide having a number average molecular weight of about 14,500 (P-1) was obtained.

Dimethoxymethylsilane in an amount of 1.8 parts by weight was allowed to react with 100 parts by weight of the resulting allyl-terminated polypropylene oxide (P-1) using a 150 ppm isopropyl alcohol solution of a platinum vinyl siloxane complex having a platinum content of 3% by weight as a catalyst at 90° C. for 2 hrs, whereby a dimethoxymethylsilyl group-terminated polyoxypropylene based polymer (B-1) was obtained. Furthermore, the silyl group introduction rate was determined by the following method with $^1$H-NMR (measured using JNM-LA400 manufactured by JEOL, Ltd. in a $CDCl_3$ solvent). The silyl group introduction rate (C'/C) was about 80% which was determined from the relative value (C=T/M) of the integration value (T) of the peak of the proton at the end of the allyl group ($-O-CH_2-CH=CH_2$: around 5.1 ppm) based on the integration value (M) of the peak of the methyl group ($-CH_3$: around 1.2 ppm) in the main chain of allyl-terminated polypropylene oxide (P-1) before the hydrosilylation reaction, and the relative value (C'=T'/M') of the integration value (T') of the peak of the methylene proton bound to the silicon atom of the terminal silyl group ($-O-CH_2-CH_2-CH_2-Si(CH_3)(OCH_3)_2$: around 0.6 ppm) based on the integration value (M') of the peak of the methyl group ($-CH_3$: around 1.2 ppm) in the main chain of dimethoxymethylsilyl group-terminated polypropylene oxide (B-1). Since the polymer (B-1) is bifunctional, the number of the terminal dimethoxymethylsilyl groups can be calculated as about 1.6 on average per molecule.

Example 1

After azeotropic dehydration of 100 parts by weight of the dimethoxymethylsilyl group-terminated polyoxypropylene based polymer (B-1) obtained in Synthesis Example 1 was carried out with toluene, 2.5 parts by weight of a $BF_3$ diethyl ether complex was slowly added dropwise and mixed at room temperature while stirring thoroughly under a nitrogen gas stream. The reaction temperature was then elevated to 50° C., and the reaction was allowed for 2 hrs. The reaction product was collected, and the $^1$H-NMR spectrum was determined, in which the peak (s, 0.1 ppm) corresponding to $Si-CH_3$ of the dimethoxymethylsilyl group of the polymer (B-1) used as the raw material disappeared, while the peak (t, 0.3 ppm) representing $Si-CH_3$ of the difluoromethylsilyl group appeared. Accordingly, it was verified that the dimethoxymethylsilyl group in the polymer (B-1) was converted quantitatively into a difluoromethylsilyl group. Devolatilization under reduced pressure was carried out using a vacuum pump at 90° C. for 2 hrs to remove diethyl ether and $BF_3$-derived components. Thus, a difluoromethylsilyl group-terminated polyoxypropylene based polymer (A-1) having a number average molecular weight of 16,000 (in terms of the polystyrene equivalent molecular weight determined using: Shodex GPC K-804 manufactured by Showa Denko K.K. as a GPC column; and $CHCl_3$ as a solvent) was obtained. The number of the difluoromethylsilyl group of the polymer (A-1) was about 1.7 on average per molecule. The $^1$H-NMR spectral analysis was performed with the peak of $CHCl_3$ as a standard value (7.26 ppm). The amount of boron (B) included in the polymer (A-1) determined by ICP mass spectrometry was about 16 ppm. For the ICP mass spectrometry, Agilent 7500C manufactured by Yokogawa Analytical Systems was used.

Example 1'

A difluoromethylsilyl group-terminated polyoxypropylene based polymer (A-1') having a number average molecular weight of 16,000 was obtained by a similar operation to Example 1 except that the operation of removal of the $BF_3$-derived components using the vacuum pump was not carried out. The amount of B included in the polymer (A-1') was about 960 ppm.

Experiment Example

The polymer (A-1) and the polymer (A-1') each in an amount of 100 parts by weight were mixed with 100 parts by weight of the polymer (B-1) 100 parts by weight, respectively, to give mixture 1 and mixture 1'. The viscosity was measured using an E type viscometer (manufactured by Tokyo Keiki Inc.) immediately after mixing and on day 14 after mixing, and thus the rate of increase in the viscosity was determined. The mixing operation was carried out under a condition of a temperature being 23° C. and a humidity being 50%, and the mixture was preserved in a sample bottle sealed tightly. The temperature condition of viscosity measurement was 23° C. The rate of increase of viscosity was about 1.4 times in the mixture 1, while it was about 3.2 times in the mixture 1'.

Examples 2 to 7, Comparative Examples 1 to 3

An amine compound (C) was added as a curing catalyst to the polymer (A-1) and/or the polymer (B-1) which had been weighed into a mini cup according to the composition shown in Table 1, and the mixture was kneaded well with a spatula for 1 min. After kneading, the cup was left to stand still in a chamber kept at constant temperature and humidity, at 25° C. and 50%, and the time point of this operation was regarded as curing start time. The tip of the spatula was brought into contact with the surface every 1 min within initial 15 min, every 15 min within the following 2 hrs, and every 1 hour thereafter. Accordingly, the time at which adhesion of the composition to the spatula failed was determined as a skin formation time, whereby the curing time was derived. The results are shown in Table 1.

When the amine compound (C) as a curing catalyst was kneaded with the polymer (A-1), curing proceeded rapidly, whereby the cured product was obtained (Examples 2 and 6). Also in the case in which the polymer (A-1) and the polymer (B-1) were used in combination, quick curability was exhibited (Examples 3, 4, 5 and 7). To the contrary, even though the amine compound (C) kneaded with the polymer (B-1) alone, the curing hardly proceeded, and the cured product could not be obtained even 24 hrs later (Comparative Examples 1 to 3).

Example 8

To 100 parts by weight the dimethoxysilyl group-terminated polyoxypropylene based polymer (B-1) obtained in Synthesis Example 1 was added 40 parts by weight of dehydrated diethyl ether, and the mixture was stirred. Under a nitrogen gas stream, 0.8 parts by weight of a $BF_3$ diethyl ether complex was slowly added dropwise and the reaction was allowed at room temperature. The reaction product was collected, and the $^1$H-NMR spectrum was determined, in which the peak (d, 0.2 ppm) corresponding to Si—$CH_3$ of the monofluorated silyl group yielded by substitution of one of two methoxy groups of the dimethoxymethylsilyl group of the polymer (B-1) used as the raw material with fluorine, and the peak (t, 0.3 ppm) representing Si—$CH_3$ of the difluorated silyl group having substitution of both two methoxy groups with fluorine were observed. Devolatilization under reduced pressure was carried out using a vacuum pump at 90° C. for 2 hrs to remove diethyl ether and $BF_3$-derived components. Thus, a polyoxypropylene based polymer (A-2) including a silicon group having a Si—F bond was obtained. The $^1$H-NMR spectrum revealed that the integration ratio of the peak strengths of respective Si—$CH_3$ in the dimethoxymethylsilyl group, the monofluorated silyl group, and the difluorated silyl group included in the polymer (A-2) was 10:85:5. It is concluded that the change of the dimethoxymethylsilyl group of the polymer (B-1) used as the raw material into the fluorated silyl group at the aforementioned ratio suggests that the polymer (A-2) includes about 1.4 or more monofluorated silyl groups on overage per molecule.

Examples 9 to 11, Comparative Examples 4 and 5

The amine compound (C) or an organic tin compound was added as a curing catalyst to the polymer (A-2) or the polymer (B-1) which had been weighed into a mini cup according to the composition shown in Table 2, and the mixture was kneaded well with a spatula for 1 min. After kneading, the cup was left to stand still in a chamber kept at constant tempera-

TABLE 1

| Composition (parts by weight) | | Example | | | | | | Comparative Example | | |
|---|---|---|---|---|---|---|---|---|---|---|
| | | 2 | 3 | 4 | 5 | 6 | 7 | 1 | 2 | 3 |
| Polymer (A) | A-1 | 100 | 50 | 10 | 10 | 100 | 10 | | | |
| Polymer (B) | B-1 | | 50 | 90 | 90 | | 90 | 100 | 100 | 100 |
| Amine compound (C) | DEAPA$^{(1)}$ | 2 | 2 | 2 | | | | 2 | | |
| | DBU$^{(2)}$ | | | | 1 | | | | 1 | |
| | A1110$^{(3)}$ | | | | | 2 | 2 | | | 2 |
| Curability | Skin formation time | 1 min | 1 min | 60 min | 1 min | 1 min | 1 min | >24 hrs | >24 hrs | >24 hrs |

$^{(1)}$Wako Pure Chemical Industries, Ltd.; 3-diethylaminopropylamine
$^{(2)}$Wako Pure Chemical Industries, Ltd.; 1,8-diazabicyclo[5.4.0]-7-undecene
$^{(3)}$Dow Corning Toray Co., Ltd.; 3-aminopropyltrimethoxysilane ture and humidity, at 25° C. and 50%, and the time point of this operation was regarded as curing start time. The tip of the spatula was brought into contact with the surface every 1 min within initial 15 min, every 15 min within the following 2 hrs, and every 1 hour thereafter. Accordingly, the time at which adhesion of the composition to the spatula failed was determined as a skin formation time, whereby the curing time was derived. The results are shown in Table 2.

TABLE 2

| Composition (parts by weight) | | Example | | | Comparative Example | |
|---|---|---|---|---|---|---|
| | | 9 | 10 | 11 | 4 | 5 |
| Polymer (A) | A-2 | 100 | 100 | 100 | | |
| Polymer (B) | B-1 | | | | 100 | 100 |
| Amine compound (C) | DBU[(1)] | 2 | 0.3 | | 2 | |
| | DEAPA[(2)] | | | 2 | | |
| Organic tin compound | Neostan U220H[(3)] | | | | | 2 |
| Curability | Skin formation time | 1 min | 1 min | 1 min | >24 hrs | 5 min |

[(1)]Wako Pure Chemical Industries, Ltd.; 1,8-diazabicyclo[5.4.0]-7-undecene
[(2)]Wako Pure Chemical Industries, Ltd.; 3-diethylaminopropylamine
[(3)]Nitto Kasei Co., Ltd.; dibutyltin bisacetylacetonato When DBU was allowed to act on the polymer (A-2), rapid curability i.e., the skin formation time of no longer than 1 min, was exhibited, even with a small amount (Examples 9 and 10), and rapid curability was also exhibited even though DEAPA having a comparably low catalyst activity was allowed to act (Example 11). When the polymer (B-1) was cured using an organic tin catalyst, curability similar to or greater than Comparative Example 5 was achieved. To the contrary, when DBU was allowed to act on the polymer (B-1), the curing hardly proceeded, and the cured product could not be obtained even 24 hrs later (Comparative Example 4).

Examples 12 to 13

The polymer (A-2) and the polymer (B-1) were kneaded at the proportion shown in Table 3, and the film formation time was measured in a similar manner to that described above.

TABLE 3

| Composition (parts by weight) | | Example | |
|---|---|---|---|
| | | 12 | 13 |
| Polymer (A) | A-2 | 25 | 10 |
| Polymer (B) | B-1 | 75 | 90 |
| Amine compound (C) | DBU[(1)] | 1 | 1 |
| Curability | Skin formation time | 1 min | 10 min |

[(1)]Wako Pure Chemical Industries, Ltd.; 1,8-diazabicyclo[5.4.0]-7-undecene

Sufficient curability was exhibited even though the content of the polymer (A-2) was approximately 10%.

Examples 14 to 22, Comparative Examples 6 to 11

The polymers (A-1) and (B-1), and calcium carbonate were weighed to provide the composition ratios shown in Table 4, respectively, and each mixture was kneaded using three rolls to give a base composition. Next, the base composition was weighed into a mini cup, and DBU was added thereto at each weight ratio shown in Table 4. The mixture was kneaded well with a spatula for 1 min. In Examples 15, 16 and 17, the silane compound presented in Table 4 was added prior to adding DBU, and the mixture had been kneaded for 1 min. After kneading with DBU, the cup was left to stand still in a chamber kept at constant temperature and humidity, at 25° C. and 50%, and the time point of this operation was regarded as curing start time. The tip of the spatula was brought into contact with the surface every 1 min within initial 15 min, every 5 min within the following 1 hour, and every 1 hour thereafter. Accordingly, the time at which adhesion of the composition to the spatula failed was determined as a skin formation time, whereby the curing time was derived. The results are shown in Table 4.

TABLE 4

| Composition (parts by weight) | | Example | | | | | | | | | Comparative Example | | | | | |
|---|---|---|---|---|---|---|---|---|---|---|---|---|---|---|---|---|
| | | 14 | 15 | 16 | 17 | 18 | 19 | 20 | 21 | 22 | 6 | 7 | 8 | 9 | 10 | 11 |
| Polymer (A) | A-1 | 30 | 30 | 30 | 30 | 20 | 30 | 20 | 20 | 20 | | | | | | |
| Polymer (B) | B-1 | 70 | 70 | 70 | 70 | 80 | 70 | 80 | 80 | 80 | 100 | 100 | 100 | 100 | 100 | 100 |
| Calcium carbonate | CCR[(1)] | 120 | 120 | 120 | 120 | | | | | | 120 | | | | | |
| | SEALETS 200[(2)] | | | | | 120 | | | | | | 120 | | | | |
| | PO 320B 15[(3)] | | | | | | 120 | | | | | | 120 | | | |
| | Lighten A[(3)] | | | | | | | 120 | | | | | | 120 | | |
| | Soften 3200[(4)] | | | | | | | | 120 | | | | | | 120 | |
| | Whiten SB[(4)] | | | | | | | | | 120 | | | | | | 120 |
| Silane compound | A171[(5)] | | 1.4 | | | | | | | | | | | | | |
| | LS710[(6)] | | | 2 | | | | | | | | | | | | |
| | LS2430[(7)] | | | | 2 | | | | | | | | | | | |
| Amine compound (C) | DBU[(8)] | 1.5 | 1.5 | 1.5 | 1.5 | 1 | 1 | 1 | 1 | 1 | 2 | 2 | 2 | 2 | 2 | 2 |

TABLE 4-continued

| Composition (parts by weight) | | Example | | | | | | | | | Comparative Example | | | | | |
|---|---|---|---|---|---|---|---|---|---|---|---|---|---|---|---|---|
| | | 14 | 15 | 16 | 17 | 18 | 19 | 20 | 21 | 22 | 6 | 7 | 8 | 9 | 10 | 11 |
| Curability | Film formation time | 35 min | 1 min | 1 min | 1 min | 12 min | 2 min | 2 min | 1 min | 1 min | >5 hrs | >5 hrs | >5 hrs | >5 hrs | >5 hrs | >5 hrs |

[1]Shiraishi Kogyo Kaisha, Ltd.; fatty acid-treated precipitated calcium carbonate
[2]Maruo Calcium Co., Ltd.; fatty acid ester-treated precipitated calcium carbonate
[3]Shiraishi Calcium Kaisha, Ltd.; fatty acid-treated heavy calcium carbonate
[4]Shiraishi Calcium Kaisha, Ltd.; untreated heavy calcium carbonate
[5]Dow Corning Toray Co., Ltd.; vinyltrimethoxysilane
[6]Shin-Etsu Chemical Co., Ltd.; 3-methacryloxypropyltrimethoxysilane
[7]Shin-Etsu Chemical Co., Ltd.; tetraethoxysilane
[8]Wako Pure Chemical Industries, Ltd.; 1,8-diazabicyclo[5.4.0]-7-undecene Also in the case in which calcium carbonate was blended as a filler, the composition including the polymer (A-1) as Examples exhibited favorable curability. When calcium carbonate was blended as the filler, curability is likely to be reduced. However, it was found that the curability tended to be improved by further adding a hydrolyzable silane compound (Example 15 to 17).

Synthesis Example 2

Using a mixture of polyoxypropylenediol having a molecular weight of about 2,000 and polyoxypropylenetriol having a molecular weight of about 3,000 (weight ratio: 1/1) as an initiator, polymerization of propylene oxide was carried out with a zinc hexacyano cobaltate glyme complex catalyst to obtain polypropylene oxide having a number average molecular weight of about 19,000 (in terms of the polystyrene equivalent molecular weight determined using: TSK-GEL H type manufactured by Tosoh Corporation as the column; and THF as the solvent). Subsequently, a methanol solution of 1.2 times equivalent of NaOMe based on the hydroxyl group of this hydroxyl group-terminated polypropylene oxide was added thereto, and methanol was distilled off. Further, allyl chloride was added thereto to convert the terminal hydroxyl group into an allyl group.

After 300 parts by weight of n-hexane and 300 parts by weight of water were added to 100 parts by weight of thus resulting unpurified allyl group-terminated polypropylene oxide while stirring, water was removed by centrifugal separation, and 300 parts by weight of water was added to the resulting hexane solution while stirring. After water was removed again by centrifugal separation, hexane was removed by devolatilization under reduced pressure to obtain purified allyl group-terminated polypropylene oxide (P-2).

Dimethoxymethylsilane in an amount of 1.35 parts by weight was allowed to react with 100 parts by weight of the allyl-terminated polypropylene oxide (P-2) using a 150 ppm isopropyl alcohol solution of a platinum vinyl siloxane complex having a platinum content of 3% by weight as a catalyst at 90° C. for 5 hrs, whereby a dimethoxymethylsilyl group-terminated polypropylene oxide (B-2) was obtained. By a similar method to Synthesis Example 1, the number of the terminal dimethoxymethylsilyl groups was calculated as about 1.7 on average per molecule.

Example 23

After azeotropic dehydration of 100 parts by weight of the dimethoxymethylsilyl group-terminated polypropylene oxide (B-2) obtained in Synthesis Example 2 was carried out with toluene, 2.2 parts by weight of dehydrated methanol was added thereto, and mixed while stirring under a nitrogen gas stream. Then, 1.4 parts by weight of a $BF_3$ diethyl ether complex was slowly added dropwise and mixed at 60° C. After completing the dropwise addition, the reaction temperature was then elevated to 120° C., and the reaction was allowed for 30 min. The reaction product was collected, and the $^1$H-NMR spectrum was determined, in which the peak (s, 0.1 ppm) corresponding to Si—$CH_3$ of the dimethoxymethylsilyl group of the polymer (B-2) used as the raw material disappeared, while the peak (t, 0.3 ppm) representing Si—$CH_3$ of the difluoromethylsilyl group appeared. Accordingly, it was verified that the dimethoxymethylsilyl group in the polymer (B-2) was converted quantitatively into a difluoromethylsilyl group. Devolatilization under reduced pressure was carried out at 120° C. for 2 hrs to remove methanol, diethyl ether and $BF_3$-derived components. Thus, a difluoromethylsilyl group-terminated polyoxypropylene based polymer (A-3) was obtained.

Examples 24 to 27, Comparative Example 12

According to the composition ratios shown in Table 5, the polymers (A-3) and (B-2), calcium carbonate, titanium oxide, a plasticizer, a thixotropic agent, an ultraviolet absorber, and a light stabilizer were admixed with the following method to product base composition. Calcium carbonate and titanium oxide were weighed into a planetary mixer, and devolatilization under reduced pressure was carried out while heating with stirring for 2 hrs to permit dehydration. Next, the polymer (B-2), the plasticizer, the thixotropic agent, the ultraviolet absorber, and the light stabilizer were added thereto, followed by heating with stirring for additional 2 hrs, thereby allowing for devolatilization under reduced pressure. The mixture was cooled to approximately room temperature as it is in a state with reduced pressure, and the pressure was restored with nitrogen. In order to suppress contamination of the moisture, the polymer (A-3) was added under a nitrogen gas stream, and the mixture was stirred and kneaded thoroughly at room temperature. After the mixture was subjected to degassing under reduced pressure, it was encapsulated in an aluminum cartridge to produce a dehydrated base composition.

The base composition was pushed out from the aluminum cartridge to a mini cup, and thereto was added a silane compound according to Table 5. The mixture was mixed well with a spatula for 1 min while stirring. Thereafter an amine compound was added, which was mixed with stirring for 1 min. The cup was left to stand still in a chamber kept at constant temperature and humidity, at 25° C. and 50%, and the time point of this operation was regarded as curing start time. The tip of the spatula was brought into contact with the surface every 1 min within initial 15 min, and every 5 min within the following 1 hour. Accordingly, the time at which adhesion of the composition to the spatula failed was determined as a skin formation time, whereby the curing time was derived. In this procedure, 1-phenylguanidine was added in a 50% by weight solution of Actcall P23, and Table 5 presents the amount of thus added 1-phenylguanidine. The results are shown in Table 5.

TABLE 5

| Composition | | Example | | | | Compar. Example |
|---|---|---|---|---|---|---|
| (parts by weight) | | 24 | 25 | 26 | 27 | 12 |
| Polymer (A) | A-3 | 10 | 10 | 10 | 10 | |
| Polymer (B) | B-2 | 90 | 90 | 90 | 90 | 100 |
| Calcium carbonate | CCR[1] | 120 | 120 | | | 120 |
| | SEALETS 200[2] | | | 120 | 120 | |
| Pigment | TAIPEQUE R820[3] | 20 | 20 | 20 | 20 | 20 |
| Plasticizer | Actcall P23[4] | 55 | 55 | 55 | 55 | 55 |
| Thixotropic agent | Dispalon 6500[5] | 2 | 2 | 2 | 2 | 2 |
| Ultraviolet absorber | TINUVIN 327[6] | 1 | 1 | 1 | 1 | 1 |
| Light stabilizer | SANOL LS770[7] | 1 | 1 | 1 | 1 | 1 |
| Silane compound | A 171[8] | 2 | | | | 2 |
| | Methylsilicate 51[9] | | 2 | 2 | | |
| | Ethylsilicate 40[10] | | | | 2 | |
| Amine compound | 1-phenylguanidine[11] | 4 | | | | 4 |
| (C) | A 1120[12] | 3 | 3 | 3 | 3 | 3 |
| Curability | Skin formation time | 30 min | 1 min | 1 min | 8 min | 55 min |

[1]Shiraishi Kogyo Kaisha, Ltd.; fatty acid-treated precipitated calcium carbonate
[2]Maruo Calcium Co., Ltd.; fatty acid ester-treated precipitated calcium carbonate
[3]Ishihara Sangyo Kaisha, Ltd.; titanium oxide
[4]Mitsui Takeda Chemicals, Inc.; polypropylene glycol
[5]Kusumoto Chemicals, Ltd.; fatty acid amide wax
[6]Ciba Specialty Chemicals; 2-(3,5-di-tert-butyl-2-hydroxyphenyl)-5-chlorobenzotriazole
[7]SANKYO Co., Ltd.; bis(2,2,6,6-tetramethyl-4-piperidyl)sebacate
[8]Dow Corning Toray Co., Ltd.; vinyltrimethoxysilane
[9]Tama Chemicals Co., Ltd.
[10]COLCOAT CO., Ltd.
[11]Nippon Carbide Industries Co., Inc.
[12]Dow Corning Toray Co., Ltd.; product containing high quantity of oligomer of 3-aminopropyltrimethoxysilane As compared with the composition of Comparative Example 12 in which (B-2) alone was used as the polymer, the composition including the polymer (A-3) exhibited favorable curability.

Synthesis Example 3

Into a reaction vessel made to have a deoxygenated state, were charged 0.84 parts by weight of cuprous bromide, and 20 parts by weight of n-butyl acrylate, followed by heating with stirring. As a polymerization solvent, 8.8 parts by weight of acetonitrile was added, and as an initiator, 1.76 parts by weight of diethyl 2,5-dibromoadipate were added, and then mixed. Pentamethyldiethylenetriamine (hereinafter, may be referred to as triamine) was added at about 80° C. to initiate the polymerization. Next, 80 parts by weight of n-butyl acrylate was added sequentially, whereby the polymerization reaction was allowed to proceed. During the polymerization, the polymerization rate was regulated such that internal temperature was kept to be about 80° C. to 90° C. by adding triamine appropriately. Total amount of the triamine used in the polymerization was 0.15 parts by weight. When the monomer conversion rate (polymerization reaction rate) became about no less than 95%, unreacted n-butyl acrylate and acetonitrile were removed by devolatilization under reduced pressure. Subsequently, 35 parts by weight of acetonitrile, 21 parts by weight of 1,7-octadiene, and 0.34 parts by weight of triamine were added, and the mixture was stirred to allow for the reaction again. By the reaction permitted at about 80° C. to 90° C. for several hours, the alkenyl group was introduced to the end of the polymer.

A mixed gas of oxygen-nitrogen was introduced into the gas phase of the reaction vessel, and the reaction mixture was stirred for several hours while keeping the internal temperature at about 80° C. to 90° C. to bring the polymerization catalyst into contact with oxygen. After removing acetonitrile and octadiene by devolatilization under reduced pressure, 150 parts by weight of butyl acetate was added to dilute the residual matter. After a filtration aid was added and the mixture was stirred, insoluble catalyst component was removed by filtration. Thus obtained filtrate was charged into a reaction vessel, and 1 part by weight of aluminum silicate (manufactured by Kyowa Chemical Industry Co., Ltd., Kyowaad® 700SEN), and 1 part by weight of hydrotalcite (manufactured by Kyowa Chemical Industry Co., Ltd., Kyowaad® 500SH) were added as adsorbing agents. A mixed gas of oxygen-nitrogen was introduced thereto, and heated at about 100° C. for 1 hour while stirring, followed by filtration to remove insoluble components such as adsorbing agents and the like. The filtrate was concentrated under reduced pressure, whereby a polymer crude product was obtained.

To 100 parts by weight of the polymer crude product were added 0.2 parts by weight of a heat stabilizer (manufactured by Sumitomo Chemical Co., Ltd., Sumilizer GS), and Kyowaad® 700SEN and Kyowaad® 500SH as adsorbing agents. The temperature was elevated with devolatilization under reduced pressure, while heating and stirring, and devolatilization and stirring were continued while keeping the state of a high temperature at about 170° C. to 200° C. for several hours to execute the purification through detachment of the halogen group in the polymer followed by adsorption. A mixed gas of oxygen-nitrogen was introduced thereto, and 10 parts by weight of butyl acetate was added. Further, the aforementioned adsorbing agent was added, and heating and stirring were continued while keeping the state of a high temperature at about 170° C. to 200° C. The amount of the adsorbing agents used in this purification step in total was 1.5 parts by weight for Kyowaad® 700SEN, and 1.5 parts by weight for Kyowaad® 500SH. After the adsorbing agent was removed through dilution with butyl acetate followed by filtration, the filtrate was concentrated to obtain an acrylic ester based polymer (P-3) having an alkenyl group at both terminals.

To 100 parts by weight of the acrylic ester based polymer (P-3) were added 0.03 parts by weight (300 ppm) of an isopropyl alcohol solution of a platinum vinyl siloxane complex having a platinum content of 3% by weight, 1.7 parts by weight of dimethoxymethylsilane, and 0.9 parts by weight of methyl orthoformate, and the reaction was allowed at about 100° C. for 1 hour. Unreacted dimethoxymethylsilane was distilled off under reduced pressure to obtain a dimethoxymethylsilyl group-terminated acrylic ester based polymer (B-3). The polymer (B-3) had a number average molecular weight of about 25,600 (in terms of the polystyrene equivalent molecular weight determined using: Shodex GPC K-804 manufactured by Showa Denko K.K. as a GPC column; and $CHCl_3$ as a solvent). Also, the number of dimethoxymethylsilyl groups determined with the concentration of the terminal silyl group calculated from $^1H$ NMR spectrum and the number average molecular weight was 1.9 on average per molecule.

Example 28

After azeotropic dehydration of 100 parts by weight of the dimethoxymethylsilyl group-terminated acrylic ester based polymer (B-2) obtained in Synthesis Example 3 was carried out with toluene, 0.7 parts by weight of a $BF_3$ diethyl ether complex was slowly added dropwise and mixed at 60° C. while stirring thoroughly under a nitrogen gas stream. The reaction temperature was then elevated to 120° C., and the reaction was allowed for about 1 hour. Subsequently, devolatilization under reduced pressure was carried out at a temperature kept at 120° C. for 2 hrs to remove diethyl ether and $BF_3$-derived components. The $^1H$-NMR spectrum was determined, in which the peak (d, 0.2 ppm) corresponding to Si—$CH_3$ of the monofluorated silyl group yielded by substitution of one of two methoxy groups of the dimethoxymethylsilyl group of the polymer (B-3) used as the raw material with fluorine, and the peak (t, 0.3 ppm) representing Si—$CH_3$ of the difluorated silyl group having substitution of both two methoxy groups with fluorine were observed. Thus, it was ascertained that an acrylic ester based polymer (A-4) including a silicon group having a Si—F bond was obtained. The integration ratio of the peak strengths of respective Si—$CH_3$ of the dimethoxymethylsilyl group, the monofluorated silyl group, and the difluorated silyl group included in the polymer (A-4) was 14:41:45. It is concluded that the change of the dimethoxymethylsilyl group of the polymer (B-3) used as the raw material into the fluorated silyl group at the aforementioned ratio suggests that the polymer (A-4) includes about 1.6 or more silicon groups having a Si—F bond on overage per molecule.

Examples 29 to 32, Comparative Example 13

According to the composition ratios shown in Table 6, the polymer (A-4), the polymer (B-3) and the plasticizer were weighed into a mini cup, and the mixture was kneaded well with a spatula. DBU was added to each mixture, and mixed well with the spatula for 1 min while stirring. The cup was left to stand still in a chamber kept at constant temperature and humidity, at 25° C. and 50%, and the time point of this operation was regarded as curing start time. The tip of the spatula was brought into contact with the surface every 1 min within initial 15 min, and every 5 min within the following 1 hour. Accordingly, the time at which adhesion of the composition to the spatula failed was determined as a skin formation time, whereby the curing time was derived. The results are shown in Table 6.

TABLE 6

| Composition | | Example | | | | Compar. Example |
|---|---|---|---|---|---|---|
| (parts by weight) | | 29 | 30 | 31 | 32 | 13 |
| Polymer (A) | A-4 | 10 | 5 | 10 | 5 | |
| Polymer (B) | B-3 | 90 | 95 | 90 | 95 | 100 |
| Plasticizer | DIDP[1] | | | 30 | 30 | |
| Amine compound (C) | DBU[2] | 1 | 1 | 1 | 1 | 4 |
| Curability | Skin formation time | 1 min | 2 min | 1 min | 3 min | >2 hrs |

[1]Kyowa Hakko Kogyo Co., Ltd.; diisodecyl phthalate
[2]Wako Pure Chemical Industries, Ltd.; 1,8-diazabicyclo[5.4.0]-7-undecene When the polymer (A-4) and the polymer (B-3) were used in combination as in Examples, the skin formation time was obviously exhibited to be short as compared with the case in which the polymer (B-3) was used alone.

Synthesis Example 4

A solution of 2,2'-azobis(2-methylbutyronitrile) as a polymerization initiator was added dropwise to a toluene solution of the following monomer mixture heated to 105° C. over 5 hrs, and thereafter "post polymerize" was carried out for 1 hour to obtain a (meth)acrylic ester based polymer (B-4).

Methyl methacrylate: 14.8 parts by weight; butyl acrylate: 60.6 parts by weight; stearyl methacrylate: 20.1 parts by weight; γ-methacryloxypropyldimethoxymethylsilane: 4.5 parts by weight; and 2,2'-azobis(2-methylbutyronitrile): 2.2 parts by weight.

Synthesis Example 5

After the polyoxypropylene based polymer (B-1) obtained in Synthesis Example 1 and the (meth)acrylic ester based polymer (B-4) obtained in Synthesis Example 4 were blended at a weight ratio of 70/30 on the solid content, devolatilization under reduced pressure was carried out to distill off the solvent, whereby a blend polymer (B-5) was obtained.

Example 33

After azeotropic dehydration of 100 parts by weight of the blend polymer (B-5) obtained in Synthesis Example 5 with toluene, 0.8 parts by weight of dehydrated methanol was added thereto, and the mixture was mixed with 1.5 parts by weight of a $BF_3$ methanol complex by slowly adding dropwise at 60° C. while stirring thoroughly under a nitrogen gas stream. Next, the temperature was elevated to 120° C., and the reaction was allowed for 30 min. Devolatilization under reduced pressure was carried out for 2 hrs at a temperature kept at 120° C. to distill off the volatile components. The reaction product was collected, and the $^1$H-NMR spectrum was determined, in which: the peak (s, 0.1 ppm) corresponding to the methyl group of the dimethoxymethylsilyl group of the polymer (B-5) used as the raw material disappeared; the peak (d, 0.2 ppm) corresponding to Si—CH$_3$ of the monofluorated silyl group yielded by substitution of one of two methoxy groups of the dimethoxymethylsilyl group with fluorine; and the peak (t, 0.3 ppm) representing Si—CH$_3$ of the difluorated silyl group having substitution of both two methoxy groups with fluorine were observed. Accordingly, it was ascertained that a polymer including a silicon group having a Si—F bond (A-5) was obtained. The integration ratio of the peak strengths of respective Si—CH$_3$ in the monofluorated silyl group, and the difluorated silyl group included in the polymer (A-5) was 31:69.

Examples 34 and 35, Comparative Example 14

The polymer (A-5) and the polymer (B-5) were kneaded at the proportion shown in Table 7, and the film formation time was measured in a similar manner to that described above.

TABLE 7

| Composition (parts by weight) | | Example 34 | Example 35 | Compar. Example 14 |
|---|---|---|---|---|
| Polymer (A) | A-5 | 100 | 10 | |
| Polymer (B) | B-5 | | 90 | 100 |
| Amine compound (C) | DBU[1] | 2 | 1 | 2 |
| Curability | Skin formation time | 1 min | 1 min | >2 hrs |

[1]Wako Pure Chemical Industries, Ltd.; 1,8-diazabicyclo[5.4.0]-7-undecene

The curable composition including the polymer (A-5) as in Examples exhibited obviously a shorter skin formation time as compared with the composition including the polymer (B-5) alone as the polymer component.

Synthesis Example 6

A 2-L pressure tight glass vessel was equipped with a three-way stopcock, and after the atmosphere in the vessel was replaced with nitrogen, 138 ml of ethylcyclohexane (dried by leaving to stand with Molecular sieves 3A overnight or longer), 1012 ml of toluene (dried by leaving to stand with Molecular sieves 3A overnight or longer) and 8.14 g (35.2 mmol) of 1,4-bis(a-chloroisopropyl)benzene were added into the vessel using a syringe.

Next, a liquefied gas collecting tube made of pressure tight glass equipped with a needle valve which had been charged with 254 ml (2.99 mol) of isobutylene monomer was connected to the three-way stopcock, and the polymerization vessel was immersed in a −70° C. dry ice/ethanol bath to allow for cooling. Thereafter, the pressure in the vessel was reduced using a vacuum pump. The needle valve was opened, and the isobutylene monomer was introduced into the polymerization vessel from the liquefied gas collecting tube. Thereafter, the pressure in the vessel was restored to ordinary pressure by introducing nitrogen from one opening of the three-way stopcock. Next, 0.387 g (4.15 mmol) of 2-methylpyridine was added thereto. Subsequently, 4.90 ml (44.7 mmol) of titanium tetrachloride was added to initiate the polymerization. Following the reaction for a period of 70 min, 9.65 g (13.4 mmol) of allyltrimethylsilane was added thereto to allow a reaction of introducing an allyl group to the polymer at the end. Following the reaction for a period of 120 min, the reaction mixture was washed with 200 ml of water four times, and the solvent was distilled off to obtain an allyl-terminated isobutylene based polymer (P-4).

Next, 200 g of thus resulting allyl-terminated isobutylene polymer (P-4) was mixed with 60 g of a paraffin group process oil (manufactured by Idemitsu Kosan Co., Ltd., trade name Diana Process PS-32) that is a hydrocarbon based plasticizer, and the temperature of the mixture was elevated to about 75° C. Thereafter, 1.5 equivalent of methyldimethoxysilane (versus the vinyl group), and 5×10$^{-5}$ equivalent of the platinum vinyl siloxane complex (versus the vinyl group) were added to allow the hydrosilylation reaction. The reaction was followed by FT-IR, and the disappearance of olefin absorption at 1640 cm$^{-1}$ was observed in about 20 hrs. $^1$H-NMR analysis verified the production of dimethoxymethylsilyl group-terminated polyisobutylene (B-6), although yielded as a mixture with PS-32 at a ratio of 10/3. The polymer (B-6) had a number average molecular weight of 5780 (in terms of the polystyrene equivalent molecular weight using: Waters LC Module 1 for the liquid feeding system in GPC; Shodex K-804 as a column; and chloroform as the solvent), and the number of the dimethoxymethylsilyl groups was about 1.9 on average per molecule.

Example 36

To 130 parts by weight of the 10/3 mixture of the dimethoxymethylsilyl group-terminated polyisobutylene (B-6) obtained in Synthesis Example 6 and PS-32 mixture, PS-32 was further added in an amount of 20 parts by weight, and azeotropic dehydration was carried out with toluene. While stirring the mixture at 50° C., 3 parts by weight of a BF$_3$ diethyl ether complex was added. The temperature was elevated to 120° C., and reflux was allowed for 1 hour while vigorously stirring. Subsequently, devolatilization under reduced pressure was carried out for 2 hrs at a temperature kept at 120° C. to distill off the volatile components. The reaction product was collected, and the $^1$H-NMR spectrum was determined, in which: the peak (d, 0.2 ppm) corresponding to Si—CH$_3$ of the monofluorated silyl group yielded by substitution of one of two methoxy groups of the dimethoxymethylsilyl group of the polymer (B-6) used as the raw material disappeared with fluorine; and the peak (t, 0.3 ppm) representing Si—CH$_3$ of the difluorated silyl group having substitution of both two methoxy groups with fluorine were observed. Accordingly, it was ascertained that a saturated hydrocarbon based polymer (A-6) including a silicon group having a Si—F bond was obtained. The integration ratio of the peak strengths of respective Si—CH$_3$ in the dimethoxymethylsilyl group, the monofluorated silyl group, and the difluorated silyl group was 54:37:9.

Example 37, Comparative Example 15

The polymer (A-6), the polymer (B-6) and the plasticizer were kneaded at the proportion shown in Table 8, and the skin formation time was measured in a similar manner to that described above.

TABLE 8

| Composition (parts by weight) | | Example 37 | Compar. Example 15 |
|---|---|---|---|
| Polymer (A) | A-6 | 100 | |
| Polymer (B) | B-6 | | 100 |

TABLE 8-continued

| Composition (parts by weight) | | Example 37 | Compar. Example 15 |
|---|---|---|---|
| Plasticizer | PS-32 | 50 | 50 |
| Amine compound (C) | DBU[(1)] | 2 | 2 |
| Curability | Skin formation time | 1 min | >2 hrs |

[(1)]Wako Pure Chemical Industries, Ltd.; 1,8-diazabicyclo[5.4.0]-7-undecene

The curable composition including the polymer (A-6) as in Example exhibited obviously a shorter skin formation time as compared with the composition in which the polymer (B-6) alone was included as the polymer component.

The Embodiments and Examples hereinabove should be construed as being disclosed for illustrative purposes only, and are not intended to any how limit the invention. The scope of the present invention is to be defined not by the foregoing description but solely by the appended claims, and intended to include all modifications within equivalent meanings and scope of the claims.

The invention claimed is:

1. A curable composition comprising:
(A) a polymer comprising a silicon group having a Si—F bond, wherein the main chain skeleton of the polymer (A) is at least one selected from the group consisting of a polyoxyalkylene based polymer, a saturated hydrocarbon based polymer, and a (meth)acrylic ester based polymer; and
(B) a polymer having one or more silicon groups on average per molecule which are represented by the following general formula (2):

$$-SiR^3{}_{3-d}Y_d \quad (2)$$

(wherein, $R^3$ each independently represents a hydrocarbon group having 1 to 20 carbon atoms, or an organosiloxy group represented by $R^4{}_3SiO-$ ($R^4$ is each independently, a hydrocarbon group having 1 to 20 carbon atoms); further, Y is each independently, a hydroxyl group or a hydrolyzable group other than fluorine and d is any one of 1, 2, or 3), wherein said polymer (B) having one or more silicon groups has a number average molecular weight of 3,000 to 100,000.

2. The curable composition according to claim 1 wherein the polymer having one or more silicon groups on average per molecule which are represented by the above general formula (2) is an organic polymer having at least one main chain skeleton selected from the group consisting of a polyoxyalkylene based polymer, a saturated hydrocarbon based polymer, and a (meth)acrylic ester based polymer.

3. The curable composition according to claim 1 wherein Y in the above general formula (2) is an alkoxy group.

4. The curable composition according to claim 1 further comprising a curing catalyst.

5. The curable composition according to claim 4 wherein the curing catalyst is an amine compound.

6. The curable composition according to claim 1 wherein the polymer (A) comprising the silicon group having a Si—F bond has a number average molecular weight of 3,000 to 100,000.

7. The curable composition according to claim 1 wherein the silicon group having a Si—F bond is represented by the following general formula (1):

$$-SiF_a R^1{}_b Z_c \quad (1)$$

(wherein, $R^1$ represents any one of a substituted or unsubstituted hydrocarbon group having 1 to 20 carbon atoms, or an organosiloxy group represented by $R^2{}_3SiO-$ ($R^2$ is independently, a substituted or unsubstituted hydrocarbon group having 1 to 20 carbon atoms); Z is a hydroxyl group or a hydrolysable group other than fluorine; a is any one of 1, 2, or 3; b is any one of 0, 1, or 2; c is any one of 0, 1, or 2; and a+b+c is 3; and when b or c is 2, two $R^1$ or two Z may be each the same or different)

8. The curable composition according to claim 7 wherein the silicon group having a Si—F bond represented by the above general formula (1) is included in the number of one or more on average per molecule.

9. The curable composition according to claim 7 wherein Z in the above general formula (1) is an alkoxy group.

10. A sealant prepared using the curable composition according to claim 1.

11. An adhesive prepared using the curable composition according to claim 1.

* * * * *